(12) United States Patent
Hasegawa et al.

(10) Patent No.: US 7,746,938 B2
(45) Date of Patent: Jun. 29, 2010

(54) PILOT MULTIPLEXING METHOD AND OFDM RECEIVING METHOD IN OFDM SYSTEM

(75) Inventors: Tsuyoshi Hasegawa, Kawasaki (JP); Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1706 days.

(21) Appl. No.: 10/862,496

(22) Filed: Jun. 7, 2004

(65) Prior Publication Data

US 2004/0252629 A1    Dec. 16, 2004

Related U.S. Application Data

(63) Continuation of application No. PCT/JP02/00059, filed on Jan. 10, 2002.

(51) Int. Cl.
*H04L 27/28*    (2006.01)
(52) U.S. Cl. .................................. 375/260
(58) Field of Classification Search ............... 375/130, 375/131, 132, 133, 134, 135, 138, 139, 145, 375/146, 149, 260, 267, 299, 347, 349; 700/53; 455/101, 132–141
See application file for complete search history.

(56) References Cited

U.S. PATENT DOCUMENTS 7,286,508 B2 * 10/2007 Abeta et al. ................. 370/335
2002/0159425 A1 * 10/2002 Uesugi et al. ............... 370/342

FOREIGN PATENT DOCUMENTS

| EP | 1 128 592 | 8/2001 |
|----|-----------|--------|
| EP | 1 158 709 | 11/2001 |
| JP | 2001-197037 | 7/2001 |
| JP | 2001-203665 | 7/2001 |
| WO | 01/69826 | 9/2001 |

OTHER PUBLICATIONS

Sadayuki Abeta et al. MC/DS-CDMA, MC-CDMA Broadband Musen Access ni Okeru Kudari Link Pilot Channel Kosei no Kento. 2000 years The Institute of Electronics, Information and Communication Engineers. Mar. 7, 2000. p. 445.

Yukiko Hanada et al. Broadband Multi Career CDMA ni Okeru Pilot Channel Kosei o Koryo shita 3 Dankai Kosoku Cell Search Tokusei. 2001 years, The Institute of Electronics, Information and Communication Engineers, Mar. 7, 2001, pp. 783 to 784.

(Continued)

*Primary Examiner*—Sam K Ahn
(74) *Attorney, Agent, or Firm*—Myers Wolin, LLC

(57) ABSTRACT

In an OFDM transmitting apparatus, where m (where m is an integer of one or greater) adjacent subcarriers are adopted as a set, an orthogonal code generator generates orthogonal codes of each set in such a manner that the orthogonal codes will be orthogonal in the time direction in regard to m subcarriers of each set and orthogonal in the subcarrier direction in regard to m pilot symbols. An orthogonal code multiplier uses orthogonal codes of each set to multiply subcarrier components of the corresponding set, and an IFFT unit applies IFFT processing to the results of multiplication in each subcarrier.

1 Claim, 21 Drawing Sheets

OTHER PUBLICATIONS

Hiroyuki Arate et al. Broadband TD-OFCDM Packet Denso ni Okeru Kyotsu Pilot Channel Kosei no Hikaku. 2001 Years The Institute of Electronics, Information and Communication Engineers, Mar. 7, 2001, p. 496.

Supplementary European Search Report dated Apr. 5, 2006.

Sadayuki Abeta, et al. "Forward Link Capacity of Coherent DS-CDMA and MC-CDMA Broadband Packet Wireless Access in a Multi-cell Environment" Vehicular Technology Conference, vol. 5 of 6, Conference 52, Sep. 24, 2000, pp. 2213-2218, XP000988409.

Hiroyuki Atarashi, et al. "Broadband Packet Wireless Access Appropriate for High-speed and High-capacity Throughput" Vehicular Technology Conference, vol. 1 of 4, Conference 53, May 6, 2001, pp. 566-570, XP001067023.

* cited by examiner

FIG. 10
(a)
DISTRIBUTION OF CHANNEL
ESTIMATION VALUES
→PILOT SYMBOL (TIME)
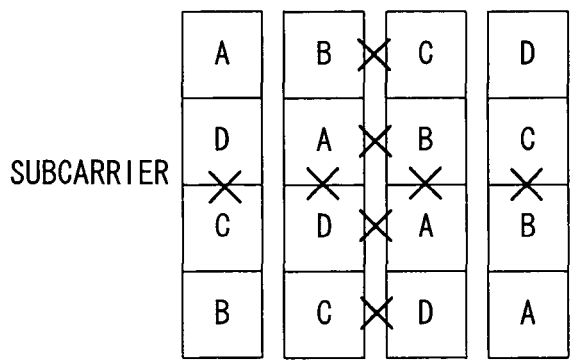
(b)
PLANAR APPROXIMATION OF DISTRIBUTION
OF CHANNEL ESTIMATION VALUES
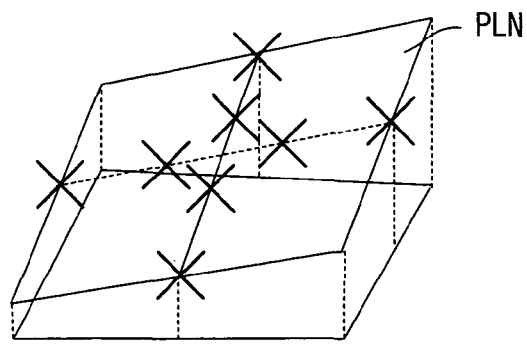
(c)
DIAGRAM FOR DESCRIBING METHOD OF LEAST SQUARES
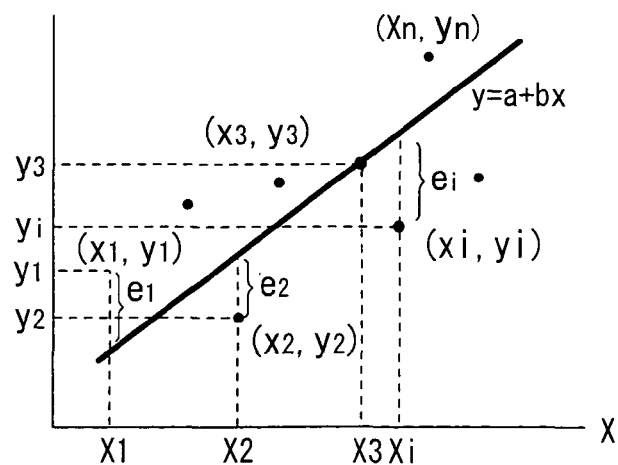

FIG. 26 PRIOR ART (a)

PILOT SYMBOL →

|   | 1 | 2 | 3 | 4 | ... k .. | Np |
|---|---|---|---|---|---|---|
| 1 | $G_1$ | $G_9$ | $G_{17}$ | $G_{25}$ | | |
| 2 | $G_2$ | $G_{10}$ | $G_{18}$ | $G_{26}$ | | |
| 3 | $G_3$ | $G_{11}$ | $G_{19}$ | $G_{27}$ | | |
| 4 | $G_4$ | $G_{12}$ | $G_{20}$ | $G_{28}$ | | |
| 5 | $G_5$ | $G_{13}$ | $G_{21}$ | $G_{29}$ | | |
| 6 | $G_6$ | $G_{14}$ | $G_{22}$ | $G_{30}$ | | |
| 7 | $G_7$ | $G_{15}$ | $G_{23}$ | $G_{31}$ | | |
| 8 | $G_8$ | $G_{16}$ | $G_{24}$ | $G_{32}$ | | |
| 9 | $G_9$ | $G_{17}$ | $G_{25}$ | $G_{33}$ | | |
| m | $G_m(1)$ | $G_m(2)$ | $G_m(3)$ | $G_m(4)$ | ... $G_m(k)$.. | $G_m(N_p)$ |
| 511 | $G_{511}$ | $G_7$ | $G_{15}$ | $G_{23}$ | | |
| 512 | $G_{512}$ | $G_8$ | $G_{16}$ | $G_{24}$ | | |

SUBCARRIER NO. ↓

(b)

PILOT SYMBOL →

|   | 1 | 2 | 3 | 4 | ... k ... | Np |
|---|---|---|---|---|---|---|
| 1 | $G_1$ | $G_1$ | $G_1$ | $G_1$ | | $G_1$ |
| 2 | $G_2$ | $G_2$ | $G_2$ | $G_2$ | | $G_2$ |
| 3 | $G_3$ | $G_3$ | $G_3$ | $G_3$ | | $G_3$ |
| 4 | $G_4$ | $G_4$ | $G_4$ | $G_4$ | | $G_4$ |
| 5 | $G_5$ | $G_5$ | $G_5$ | $G_5$ | | $G_5$ |
| 6 | $G_6$ | $G_6$ | $G_6$ | $G_6$ | | $G_6$ |
| 7 | $G_7$ | $G_7$ | $G_7$ | $G_7$ | | $G_7$ |
| 8 | $G_8$ | $G_8$ | $G_8$ | $G_8$ | | $G_8$ |
| 9 | $G_9$ | $G_9$ | $G_9$ | $G_9$ | | $G_9$ |
| m | $G_m$ | $G_m$ | $G_m$ | $G_m$ | ... $G_m$ | $G_m$ |
| 511 | $G_{511}$ | $G_{511}$ | $G_{511}$ | $G_{511}$ | | $G_{511}$ |
| 512 | $G_{512}$ | $G_{512}$ | $G_{512}$ | $G_{512}$ | | $G_{512}$ |

SUBCARRIER NO. ↓

PILOT MULTIPLEXING METHOD AND OFDM RECEIVING METHOD IN OFDM SYSTEM

CROSS REFERENCE TO RELATED APPLICATIONS

The present application is a continuation of International Application No. PCT/JP02/00059 which was filed on Jan. 10, 2002.

BACKGROUND OF THE INVENTION

This invention relates to a pilot multiplexing method and OFDM receiving method in an OFDM system and, more particularly, to a pilot multiplexing method and OFDM receiving method in an OFDM system for spreading pilot symbols by prescribed orthogonal codes and transmitting the pilot symbols together with transmit symbols.

Multicarrier modulation schemes have become the focus of attention as next-generation mobile communication schemes. Using multicarrier modulation not only makes it possible to implement wideband, high-speed data transmission but also enables the effects of frequency-selective fading to be mitigated by narrowing the band of each subcarrier. Further, using orthogonal frequency division multiplexing not only makes it possible to raise the efficiency of frequency utilization but also enables the effects of inter-symbol interference to be eliminated by providing a guard interval for every OFDM symbol.

(a) of FIG. 16 is a diagram useful in describing a multicarrier transmission scheme. A serial/parallel converter 1 converts serial data to parallel data and inputs the parallel data to orthogonal modulators 3a to 3d via low-pass filters 2a to 2d, respectively. In the Figure, the conversion is to parallel data comprising four symbols S1 to S4. Each symbol includes an in-phase component and a quadrature component. The orthogonal modulators 3a to 3d subject each of the symbols to orthogonal modulation by subcarriers having frequencies $f_1$ to $f_4$ illustrated in (b) of FIG. 16, a combiner 4 combines the orthogonally modulated signals and a transmitter (not shown) up-converts the combined signal to a high-frequency signal and then transmits the high-frequency signal. With the multicarrier transmission scheme, the frequencies are arranged, as shown at (b) of FIG. 16, in such a manner that the spectrums will not overlap in order to satisfy the orthogonality of the subcarriers.

In orthogonal frequency division multiplexing, frequency spacing is arranged so as to null the correlation between a modulation band signal transmitted by an nth subcarrier of a multicarrier transmission and a modulation band signal transmitted by an (n+1)th subcarrier. (a) of FIG. 17 is a diagram of the structure of a transmitting apparatus that relies upon the orthogonal frequency division multiplexing scheme. A serial/parallel converter 5 converts serial data to parallel data comprising a plurality of symbols (I+jQ, which is a complex number). An IDFT (Inverse Discrete Fourier Transform) 6, which is for the purpose of transmitting the symbols as subcarriers having a frequency spacing shown in (b) of FIG. 17, applies an inverse discrete Fourier transform to the frequency data to effect a conversion to time data, and inputs the real and imaginary parts to an orthogonal modulator 8 through low-pass filters 7a, 7b. The orthogonal modulator 8 subjects the input data to orthogonal modulation, and a transmitter (not shown) up-converts the modulated signal to a high-frequency signal. In accordance with orthogonal frequency division multiplexing, a frequency placement of the kind shown in (b) of FIG. 17 becomes possible, thereby enabling an improvement in the efficiency with which frequency is utilized.

In recent years, there has been extensive research in multicarrier CDMA schemes (MD-CDMA) and application thereof to next-generation wideband mobile communications is being studied. With MC-CDMA, partitioning into a plurality of subcarriers is achieved by serial-to-parallel conversion of transmit data and spreading of orthogonal codes in the frequency domain. Owing to frequency-selective fading, subcarriers distanced by their frequency spacing experience independent fading on an individual basis. Accordingly, by causing code-spread subcarrier signals to be distributed along the frequency axis by frequency interleaving, a despread signal can acquire frequency-diversity gain.

An orthogonal frequency/code division multiple access (OFDM/CDMA) scheme, which is a combination of OFDM and MC-CDMA, also is being studied. This is a scheme in which a signal, which has been divided into subcarriers by MC-CDMA, is subjected to orthogonal frequency multiplexing to raise the efficiency of frequency utilization.

A CDMA (Code Division Multiple Access) scheme multiplies transmit data having a bit cycle $T_s$ by spreading codes $C_1$ to $C_N$ of chip cycle Tc using a multiplier 9, as shown in FIG. 18, modulates the result of multiplication and transmits the modulated signal. Owing to such multiplication, a $2/T_s$ narrow-band signal NM can be spread-spectrum modulated to a 2/Tc wideband signal DS and transmitted, as shown in FIG. 19. Here Ts/Tc is the spreading factor and, in the illustrated example, is the code length N of the spreading code. In accordance with this CDMA transmission scheme, an advantage acquired is that an interference signal can be reduced to 1/N.

According to the principles of multicarrier CDMA, N-number of items of copy data are created from a single item of transmit data D, as shown in FIG. 20, the items of copy data are multiplied individually by respective ones of codes $C_1$ to $C_N$, which are spreading codes (orthogonal codes), using multipliers $9_1$ to $9_N$, respectively, and products $DC_1$ to $DC_N$ undergo multicarrier transmission by N-number of subcarriers of frequencies $f_1$ to $f_N$ illustrated in (a) of FIG. 21. The foregoing relates to a case where a single item of symbol data undergoes multicarrier transmission. In actuality, however, as will be described later, transmit data is converted to parallel data of M symbols, the M-number of symbols are subjected to the processing shown in FIG. 20, and all results of M×N multiplications undergo multicarrier transmission using M×N subcarriers of frequencies $f_1$ to $f_{NM}$. Further, orthogonal frequency/code division multiple access can be achieved by using subcarriers having the frequency placement shown in (b) of FIG. 21.

FIG. 22 is a diagram illustrating the structure on the transmitting side of MC-CDMA (namely the structure of a base station). A data modulator 11 modulates transmit data of a user and converts it to a complex baseband signal (symbol) having an in-phase component and a quadrature component. A time multiplexer 12 time-multiplexes the pilot of the complex symbol to the front of the transmit data. A serial/parallel converter 13 converts the input data to parallel data of M symbols, and each symbol is input to a first spreader 14 upon being branched into N paths. The first spreader 14 has M-number of multipliers $14_1$ to $14_M$. The multipliers $14_1$ to $14_M$ multiply respective ones of the branched symbols individually by codes $C_1, C_2, \ldots, C_N$ constituting orthogonal codes and output the resulting signals. The orthogonal codes $C_1, C_2, \ldots, C_N$ are Walsh codes that differ for every user. As a result, subcarrier signals $S_1$ to $S_{MN}$ for multicarrier transmission by N×M subcarriers are output from the first spreader 14. That is, the first spreader 14 multiplies the symbols of every parallel sequence by the orthogonal codes, thereby performing spreading in the frequency direction. Next, a second spreader 15 further multiplies the subcarrier signals $S_1$ to $S_{MN}$ by channel identification codes (cell scramble codes) $G_1$ to $G_{MN}$ and outputs subcarrier signals $S_1'$ to $S_{MN}'$.

A code multiplexer 16 code-multiplexes the subcarrier signals generated as set forth above and the subcarrier signals of other users generated through a similar method. That is, for every subcarrier, the code multiplexer 16 combines the subcarrier signals of a plurality of users conforming to the subcarriers and outputs the result. An IFFT (Inverse Fast Fourier Transform) unit 17 applies an IFFT (Inverse Fast Fourier Transform) to the subcarrier signals that enter in parallel, thereby effecting a conversion to an OFDM signal (a real-part signal and an imaginary-part signal) on the time axis. A guard-interval insertion unit 18 inserts a guard interval into the OFDM signal, an orthogonal modulator applies orthogonal modulation to the OFDM signal into which the guard interval has been inserted, and a radio transmitter 20 up-converts the signal to a radio frequency, applies high-frequency amplification and transmits the resulting signal from an antenna.

The total number of subcarriers is (spreading factor N)×(number M of parallel sequences). Further, since fading that differs from subcarrier to subcarrier is sustained on the propagation path, a pilot is time-multiplexed onto all subcarriers and it is so arranged that fading compensation can be performed subcarrier by subcarrier on the receiving side. The time-multiplexed pilot is a common pilot that all users employ in channel estimation.

FIG. 23 is a diagram useful in describing a serial-to-parallel conversion. Here a common pilot P has been time-multiplexed to the front of one frame of transmit data. It should be noted that the common pilot P can be dispersed within a frame, as will be described later. If the common pilot per frame is, e.g., 4×M symbols and the transmit data is 28×M symbols, then M symbols of the pilot will be output from the serial/parallel converter 13 as parallel data the first four times, and thereafter M symbols of the transmit data will be output from the serial/parallel converter 13 as parallel data 28 times. As a result, in the period of one frame the pilot can be time-multiplexed into all subcarriers and transmitted. By using this pilot on the receiving side, channel estimation is performed on a per-subcarrier basis and channel compensation (fading compensation) becomes possible.

FIG. 24 is a diagram useful in describing insertion of a guard interval. If an IFFT output signal conforming to M×N subcarrier samples (=1 OFDM symbol) is taken as one unit, then guard-interval insertion signifies copying the tail-end portion of this symbol to the leading-end portion thereof. Inserting a guard interval GI makes it possible to eliminate the effects of inter-symbol interference ascribable to multipath.

FIG. 25 is a diagram showing structure on the receiving side of MC-CDMA. A radio receiver 21 subjects a received multicarrier signal to frequency conversion processing, and an orthogonal demodulator subjects the receive signal to orthogonal demodulation processing. A timing-synchronization/guard-interval removal unit 23 establishes receive-signal timing synchronization, removes the guard interval GI from the receive signal and inputs the result to an FFT (Fast Fourier Transform) unit 24. The FFT unit 24 executes FFT processing and converts the signal in the time domain to N×M-number of subcarrier signals (subcarrier samples) $SP_1$ to $SP_{MN}$ at an FFT window timing. A channel estimation unit 25a performs channel estimation on a per-subcarrier basis using the pilot time-multiplexed on the transmitting side, and a channel compensation unit 25b multiplies the FFT output by channel estimation values $CC_1$ to $CC_{MN}$ of respective ones of the subcarriers.

The channel estimation unit 25a multiplies the subcarrier components of each pilot symbol output from the FFT unit 24 by channel identification Gold codes, adds the results of multiplication subcarrier by subcarrier and calculates the channel estimation values $CC_1$ to $CC_{MN}$ of each of the subcarriers based upon the average value. That is, the channel estimation unit 25a estimates the influence $\exp(j\phi)$ of fading of each subcarrier on phase using the pilot signal, and the channel compensation unit 25b multiplies the subcarrier signal of the transmit symbol by $\exp(-j\phi)$ to compensate for fading.

A first despreader 26 multiplies the fading-compensated M×N-number of subcarrier signal components by channel identification Gold codes $G_1$ to $G_{MN}$ and outputs the results. That is, the fading-compensation signals are despread by channel identification Gold codes and a signal of the station's own address is extracted from among the code-multiplexed signals. A second despreader 27 has M-number multipliers $27_1$ to $27_M$. The multiplier $27_1$ multiplies N-number of subcarrier signals individually by codes $C_1, C_2, \ldots, C_N$ constituting orthogonal codes (Walsh codes) assigned to users and outputs the results. The other multipliers also execute similar processing. As a result, the signal addressed to the local station is despread by spreading codes assigned to each of the users, and a signal of a desired user is extracted from the code-multiplexed signals by despreading.

Combiners $28_1$ to $28_M$ each add the N-number of results of multiplication that are output from respective ones of the multipliers $27_1$ to $27_M$, thereby creating parallel data comprising M-number of symbols. A parallel/serial converter 29 converts this parallel data to serial data, and a data demodulator 30 demodulates the transmit data.

(a) of FIG. 26 is a diagram useful in describing an array of Gold codes $G_1$ to $G_{MN}$ (MN=512) for channel identification purposes. The codes are shifted eight at a time in the subcarrier direction for every OFDM symbol. The reason for shifting the codes is as follows: As mentioned above, the channel estimation unit 25a on the receiving side multiplies the subcarrier components of each pilot symbol output from the FFT unit 24 by channel identification Gold codes, adds the results of multiplication subcarrier by subcarrier and calculates the channel estimation values $CC_1$ to $CC_{MN}$ of each of the subcarriers based upon the average value. That is, a channel estimation value $CC_m$ of an mth subcarrier is given by the following equation:

$$CC_m = (1/Np) \cdot \Sigma_i R_m(k) \cdot {}^*G_m(k) \ (i=1 \text{ to } Np) \tag{1}$$

where $R_m(k)$ represents an FFT output of the mth subcarrier in a kth pilot symbol, $G_m(k)$ a channel identification Gold code of the mth subcarrier in the kth pilot symbol, and * a complex conjugate. Accordingly, in a case where the channel identification Gold codes $G_1$ to $G_{MN}$ are not shifted, as illustrated in (b) of FIG. 26, ${}^*G_m(k) = {}^*G_m$ holds and therefore we have the following:

$$CC_m = ({}^*G_m/Np) \cdot \Sigma_i R_m(k) \tag{2}$$

Similarly, if we let $G_m(k)'$ represent a channel identification Gold code of the mth carrier in the kth pilot symbol of another channel, then a channel estimation value $CC_m$ of the mth subcarrier is given by the following equation:

$$CC_m = (1/Np) \cdot \Sigma_i R_m(k) \cdot {}^*G_m(k)' \ (i=1 \text{ to } Np) \tag{3}$$

If the channel identification Gold codes $G_1$ to $G_{MN}$ are not shifted, therefore, then $*G_m(k)' = *G_m'$ holds and therefore we have the following:

$$CC_m = (*G_m'/Np) \cdot \Sigma_r R_m(k) \quad (4)$$

If $*G_m = *G_m'$ holds, then, in view of Equations (2) and (4), the channel estimation values of the mth subcarriers of the two channels will be the same. Moreover, it will no longer be possible to identify which channel estimation value belongs to which channel. For this reason, the channel identification codes are shifted in the subcarrier direction for every OFDM symbol, as depicted in (a) of FIG. 26.

FIG. 27 is a diagram for describing the operation of the channel estimation unit. Here n (n=4) pilot symbols (four OFDM pilot symbols) are multiplexed upon being dispersed within one frame composed of 32 OFDM symbols. Since one pilot symbol is composed of subcarrier samples equivalent to the number M of subcarriers (M×N, e.g., 512), subcarrier-by-subcarrier channel (amplitude characteristic and phase characteristic) estimation becomes possible by multiplying the FFT output by the channel identification Gold codes at the pilot-receive timing on the receiving side. More specifically, to perform channel estimation, n (=4) sets of m (m=8) subcarrier samples in the frequency direction are gathered in the time direction to construct one group by a total of m×n (=32) subcarrier samples, as indicated at PG1 in FIG. 27, and the average value of m×n (=32) channel estimation values in this group is adopted as the channel estimation value of the subcarrier at the center. Further, to obtain the channel estimation value of the next subcarrier, n (=4) sets of m (=8) subcarrier samples shifted by one subcarrier in the frequency direction are gathered in the time direction to construct one group by a total of 32 subcarrier samples, as indicated at PG2, and the channel estimation value is similarly calculated using the average value in the group PG2. The reason for obtaining the channel value by averaging as set forth above is that since each symbol contains noise, the effects of such noise are eliminated by averaging to thereby improve the S/N ratio. If subcarriers are very close in terms of frequency, the channel values are almost the same and therefore no problems are caused by averaging.

In OFDM communication described above, only one pilot can be used and it is not possible to deal with a case where it is desired to use pilots of a plurality of types. For example, as shown in FIG. 28, the vicinity of a base station is divided into sectors and directional beams are emitted from antennas AT1 to AT3 in sectors SC1 to SC3. In this arrangement, it is necessary to identify mobile stations MS1 to MS3 sector by sector. This means that it is necessary to use pilots that differ for every sector. With the conventional methods, however, it is not possible to use pilots of a plurality of types.

A method of using orthogonal codes is available as one method of multiplexing pilot signals of a plurality of types. This method involves adopting m (where m is an integer of one or greater) adjacent subcarriers as a set and multiplying the total of m×n subcarrier components of each set in n-number of pilot symbols by orthogonal codes. Pilot signals the number of which is equivalent to the number of orthogonal codes can be multiplexed at the same frequency and same timing.

If pilots are multiplexed by orthogonal codes, however, demultiplexing of each pilot cannot be performed until all codes are received. Consequently, a problem which arises is that it is not possible to cope with a situation where a momentary channel estimation value is desired at a stage where one or two pilot symbols, for example, have been received.

SUMMARY OF THE INVENTION

Accordingly, an object of the present invention is to arrange it so that pilots of a plurality of types can be multiplexed and, moreover, so that a channel estimation value can be calculated if several pilot symbols at the beginning of a frame are received.

An OFDM apparatus according to the present invention adopts m (where m is an integer of one or greater) adjacent subcarriers as a set and multiplies m×n subcarrier components of each set in a plurality (n-number) of pilot symbols by orthogonal codes, and multiplexes the results onto transmit data. At such time the sequence of orthogonal codes that multiply m×n subcarrier components of another set is shifted in order, whereby a channel estimation value can be calculated merely by receiving several pilot symbols at the beginning of a frame.

More specifically, an orthogonal code generator in an OFDM transmitting apparatus generates orthogonal codes of each set in such a manner that the orthogonal codes will be orthogonal in the time direction in regard to m×n subcarriers of each set and orthogonal in the subcarrier direction in regard to a total of m×n subcarriers in m-number of pilot symbols. An orthogonal code multiplier multiplies m×n subcarrier components of a first set by the orthogonal codes and similarly multiplies m×n subcarriers of other sets by the orthogonal codes upon shifting the codes. An IFFT unit applies IFFT processing to results of multiplication of the subcarriers, which are obtained in successive fashion, from the orthogonal code multiplier on a per-pilot-symbol basis, and transmits the result of processing together with data.

In an OFDM receiving apparatus, an FFT unit applies FFT processing to a receive signal and outputs a plurality of subcarrier components in regard to each pilot symbol. An orthogonal code generator of a channel estimation unit generates orthogonal codes of each set in such a manner that the orthogonal codes will be orthogonal in the time direction in regard to m×n subcarriers of each set and orthogonal in the subcarrier direction in regard to a total of m×n subcarriers in m-number of pilot symbols. A first channel estimation value calculation unit multiplies m×n subcarrier components of each set by the orthogonal codes of the set and generates channel estimation values of the subcarriers of each set based upon average values of results of multiplication. A second channel estimation value calculation unit generates channel estimation values of the subcarriers of each set based upon average values of results of multiplication between the orthogonal codes and a total of m×n subcarrier components in m-number of pilot symbols. A channel compensation unit performs channel compensation using channel estimation values of subcarriers obtained from either the first or second channel estimation value calculation unit.

Thus, in accordance with the present invention, by spreading pilot symbols using orthogonal codes, pilots of a plurality of types can be multiplexed. Moreover, channel estimation values can be calculated if several (m-number) pilot symbols at the beginning of a frame are received.

Further, in accordance with the first channel estimation value calculation unit, time equivalent to one frame is required in order to calculate a channel estimation value but an accurate channel estimation value can be obtained. In accordance with the second channel estimation value calculation unit, there is some decline in accuracy but a channel estimation value can be obtained in a short period of time by receiving m-number of pilot symbols. Accordingly, a channel estimation value can be obtained by the appropriate method.

BRIEF DESCRIPTION OF THE DRAWINGS

FIG. 10 is a diagram useful in describing a case where a distribution of channel estimation values is obtained by a planar approximation;

FIG. 26 is a diagram useful in describing an array of channel identification Gold cods $G_1$ to $G_{MN}$ (MN=512);

DESCRIPTION OF THE PREFERRED EMBODIMENTS (A) First Pilot Multiplexing Scheme Using Orthogonal Codes FIG. 1 is a diagram of frame structure useful in describing a pilot multiplexing method that uses orthogonal codes. Since it is known that the values of channels have a certain degree of correlation to the time direction and subcarrier direction, averaging can be performed in a region that extends along both the time and subcarrier directions. For example, averaging is performed two subcarriers at a time in a region extending over eight OFDM symbols per frame (a total of 2×8=16 subcarrier components). The 2×8=16 average block units shall be referred to as a despreading unit. Further, each 2×2 unit in the despreading unit shall be referred to as a subblock, with characters A, B, C, D being assigned to the subblocks.

A method using orthogonal codes is available as one method of multiplexing a plurality of pilot signals. This method of multiplexing using orthogonal codes involves adopting m (m=2 in FIG. 1) adjacent subcarriers as a set and multiplying a total of m×n (=16) subcarrier components $P_{i0}$ to $P_{i7}$, $P_{(i+1)0}$ to $P_{(i+1)7}$ (i=1, 3, 5, ... 511) of the same set in n (n=8 in FIG. 1) pilot symbols $P_0$ to $P_7$ by orthogonal codes $K_0$ to $K_{15}$ illustrated in FIG. 2, and transmitting the results. On the receiving side, the method involves performing demodulation by multiplying m×n (=16) receive subcarrier components $P_{i0}'$ to $P_{i7}'$, $P_{(i+1)0}'$ to $P_{(i+1)7}'$ (i=1, 3, 5, ... 511) by orthogonal codes $K_0$ to $K_7$, $K_8$ to $K_{15}$, respectively, and adopting the average values as the channel estimation values of the m-number of subcarriers of each set. In accordance with this method of using orthogonal codes, pilot signals the number of which is equivalent to the number of orthogonal codes can be multiplexed at the same frequency and same timing. Moreover, by multiplying using the orthogonal codes $K_0$ to $K_{16}$ and averaging on the receiving side, channel estimation values of subcarriers can be calculated in simple fashion.

Figure 2:
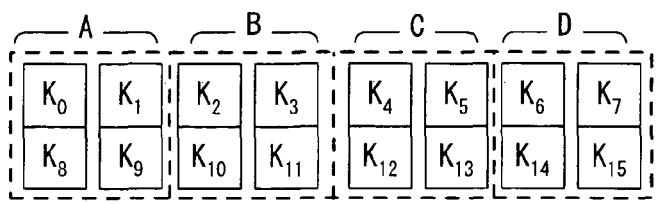
FIG. 2 illustrates an example of orthogonal codes.
Figure 3:
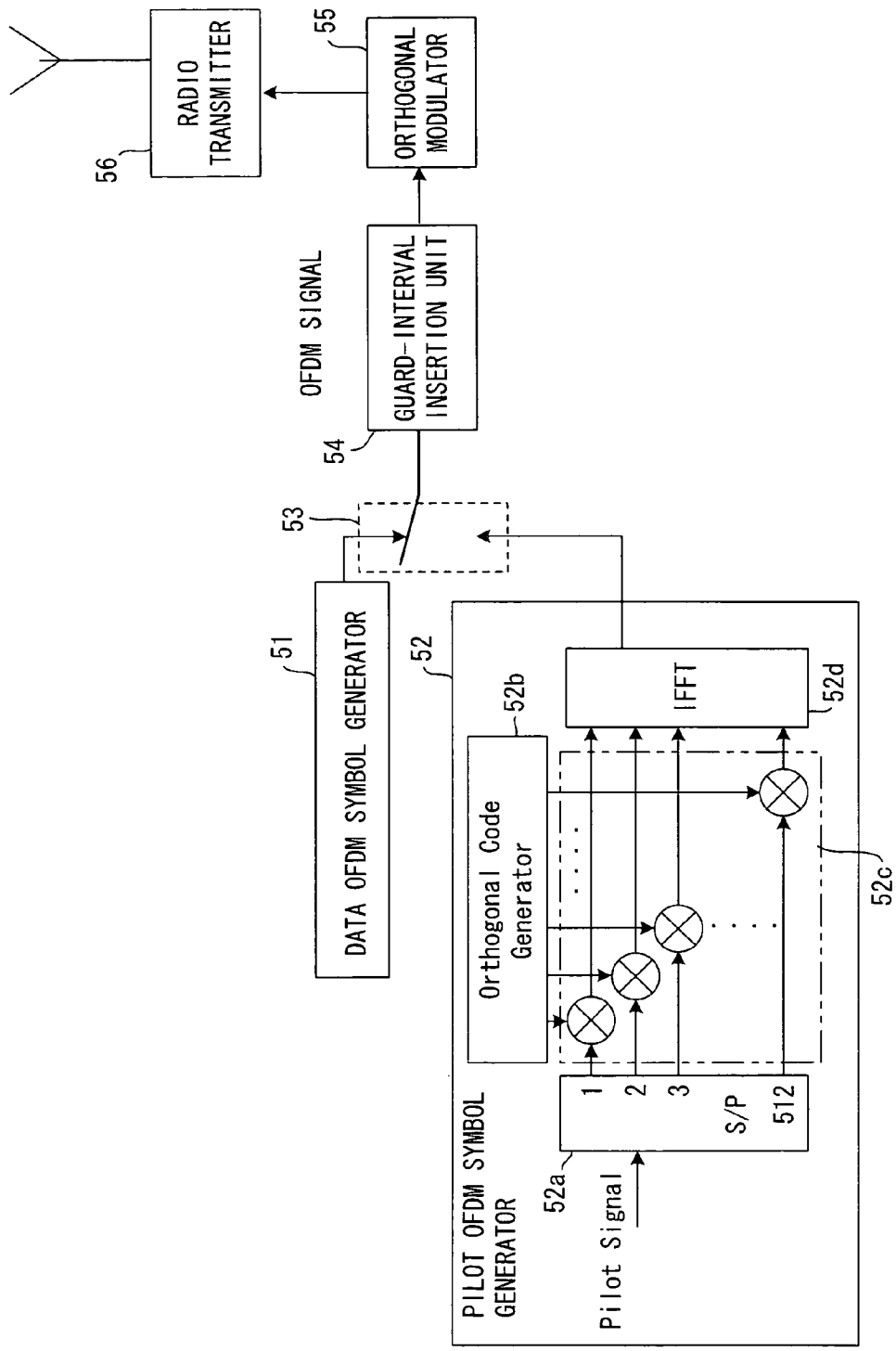
FIG. 3 is a block diagram of an OFDM transmitting apparatus for implementing pilot multiplexing using orthogonal codes.
Figure 4:
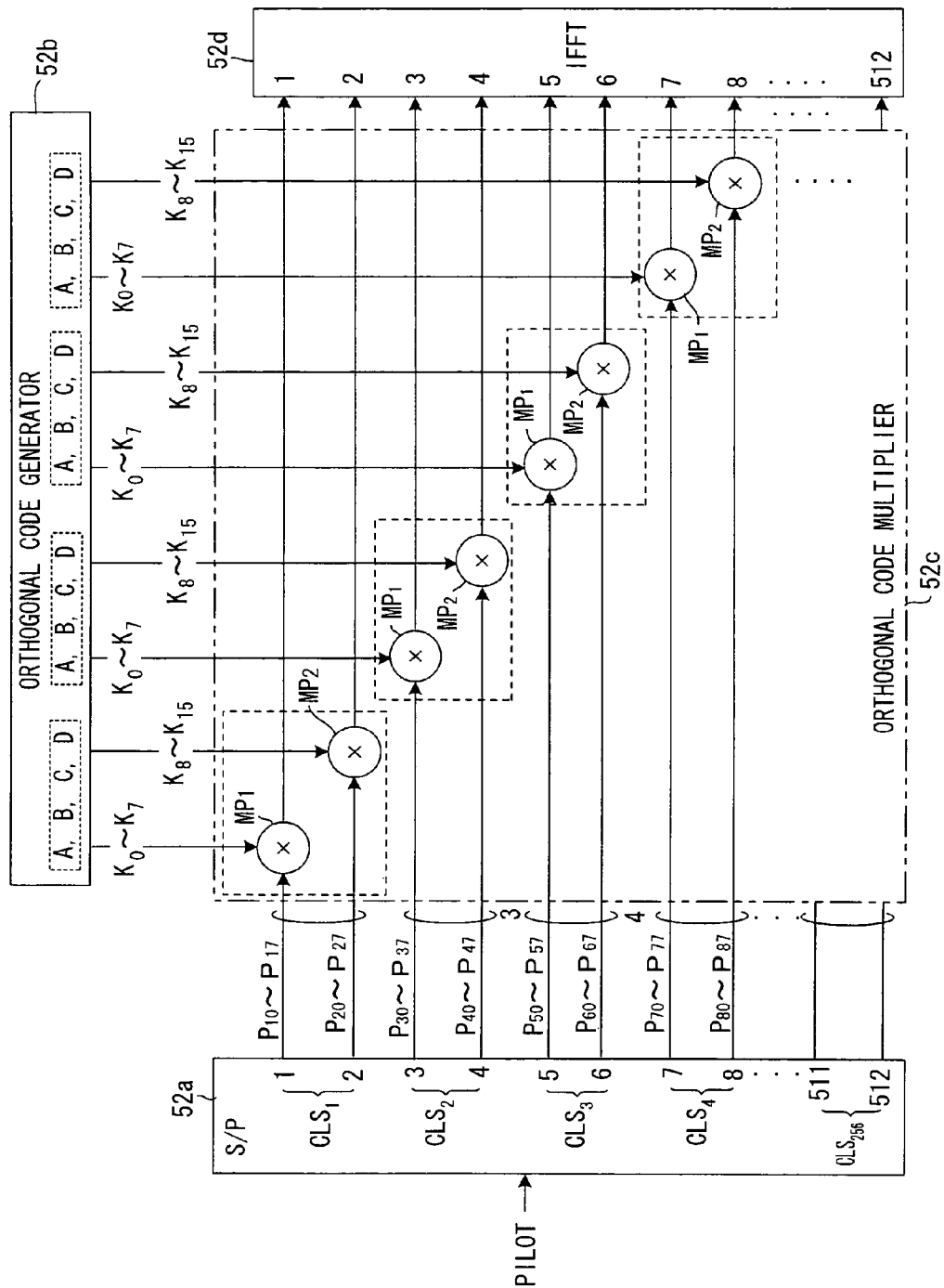
FIG. 4 is a detailed view of a pilot OFDM symbol generator.
Figure 22:
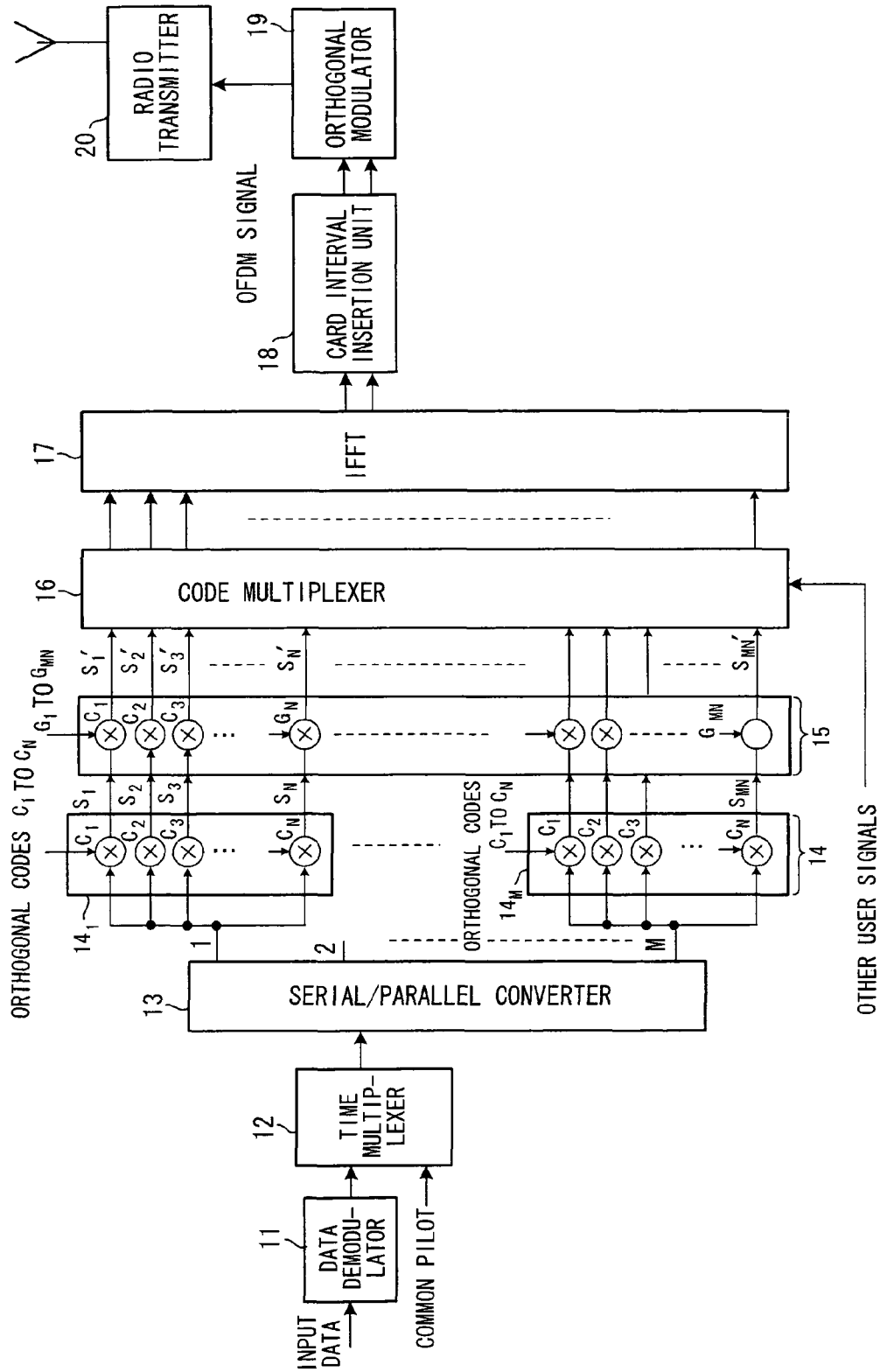
FIG. 22 is a block diagram of a transmitting side in MC-CDMA according to the prior art.
Figure 23:
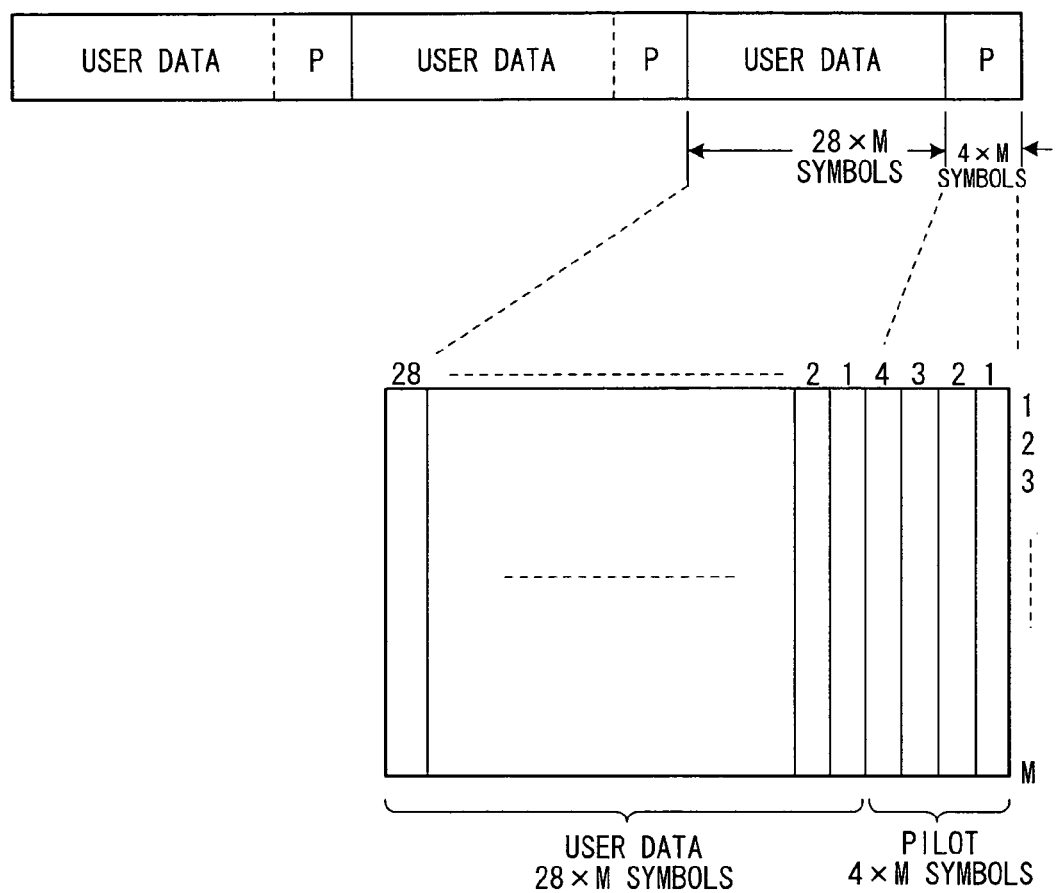
FIG. 23 is a diagram useful in describing a serial-to-parallel conversion.
Figure 24:
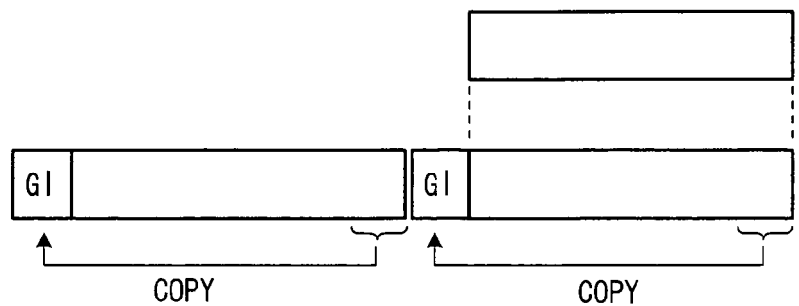
FIG. 24 is a diagram useful in describing a guard interval.

FIG. 3 is a block diagram of an OFDM transmitting apparatus for implementing pilot multiplexing using orthogonal codes, and FIG. 4 is a detailed view of a pilot OFDM symbol generator. A data OFDM symbol generator 51 has the components 11, 13 to 17 shown in FIG. 22, applies IFFT processing to the data symbols and outputs the results. A pilot OFDM symbol generator 52, which has a serial/parallel converter 52a, an orthogonal code generator 52b, an orthogonal code multiplier 52c and an IFFT unit 52d, adopts two adjacent subcarriers as a set (for a total of 256 sets in FIG. 1), multiplies a total of 16 subcarrier components $P_{i0}$ to $P_{i7}$, $P_{(i+1)0}$ to $P_{(i+1)7}$ (i=1, 3, 5, ... 511) of each of the sets in eight pilot symbols $P_0$ to $P_7$ by the orthogonal codes $K_0$ to $K_{15}$, illustrated in FIG. 2, applies IFFT processing to one symbol's worth of results of multiplication and outputs the result.

A changeover circuit 53 selects the IFFT signal, which is generated by the data OFDM symbol generator 51, at the data transmit timing, and selects the IFFT signal, which is generated by the pilot OFDM symbol generator 52, at the pilot transmit timing. A guard-interval insertion unit 54 inserts a guard interval into the OFDM signal, an orthogonal modulator 55 applies orthogonal modulation to the OFDM signal into which the guard interval has been inserted, and a radio transmitter 56 up-converts the signal to a radio frequency, applies high-frequency amplification and transmits the resulting signal from an antenna.

In the pilot OFDM symbol generator 52 (see FIG. 4), a serial/parallel converter 52a converts pilot data, which enters as a bit serial, to M-number of items of parallel data, branches a single item of pilot data into N paths and outputs a total of M×N (e.g., 512) subcarrier components. An orthogonal code generator 52b generates the orthogonal codes $K_0$ to $K_7$, $K_8$ to $K_{15}$ with respect to each of sets $CLS_1$ to $CLS_{256}$ of the total of 256 sets, each of which is composed of two adjacent subcarriers. An orthogonal code multiplication unit 52c has 512 multipliers. Two multipliers $MP_1$, $MP_2$ of each set multiply the total of 16 subcarrier components $P_{i0}$ to $P_{i7}$, $P_{(i+1)0}$ to $P_{(i+1)7}$ of each set by the orthogonal codes $K_0$ to $K_7$, $K_8$ to $K_{15}$, respectively. An IFFT unit 52d applies IFFT processing to the 512 results of multiplication on a per-symbol basis and outputs the result.

In FIG. 3, a case is described in which IFFT processing is executed in the data OFDM symbol generator 51 and pilot OFDM symbol generator 52. However, it can be so arranged that the data OFDM symbol and pilot OFDM symbol are combined before execution of IFFT processing, after which IFFT processing is executed.

Figure 5:
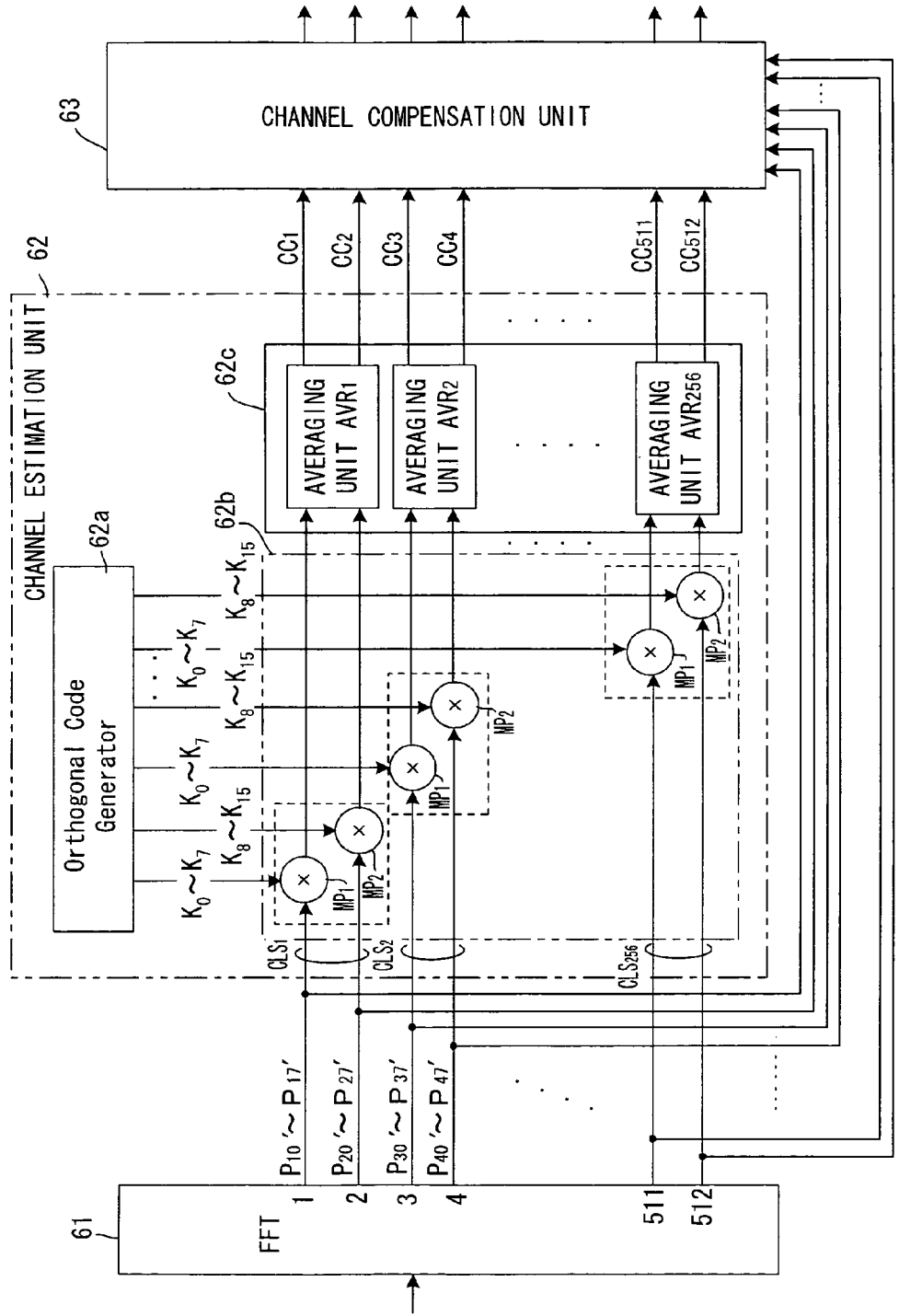
FIG. 5 is a block diagram of the main part of an OFDM receiving apparatus.
Figure 25:
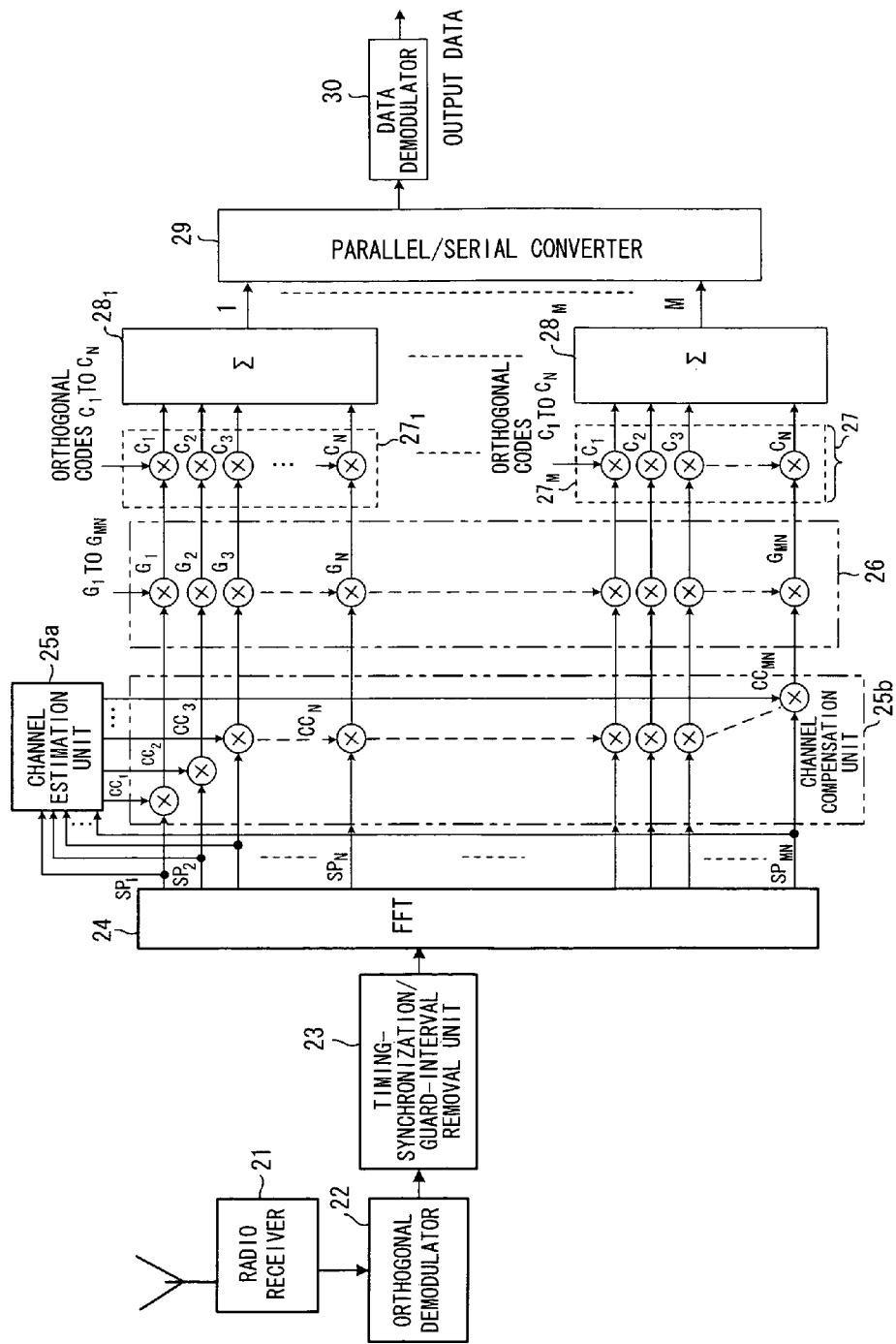
FIG. 25 is a block diagram of a receiving side in MC-CDMA according to the prior art.
Figure 27:
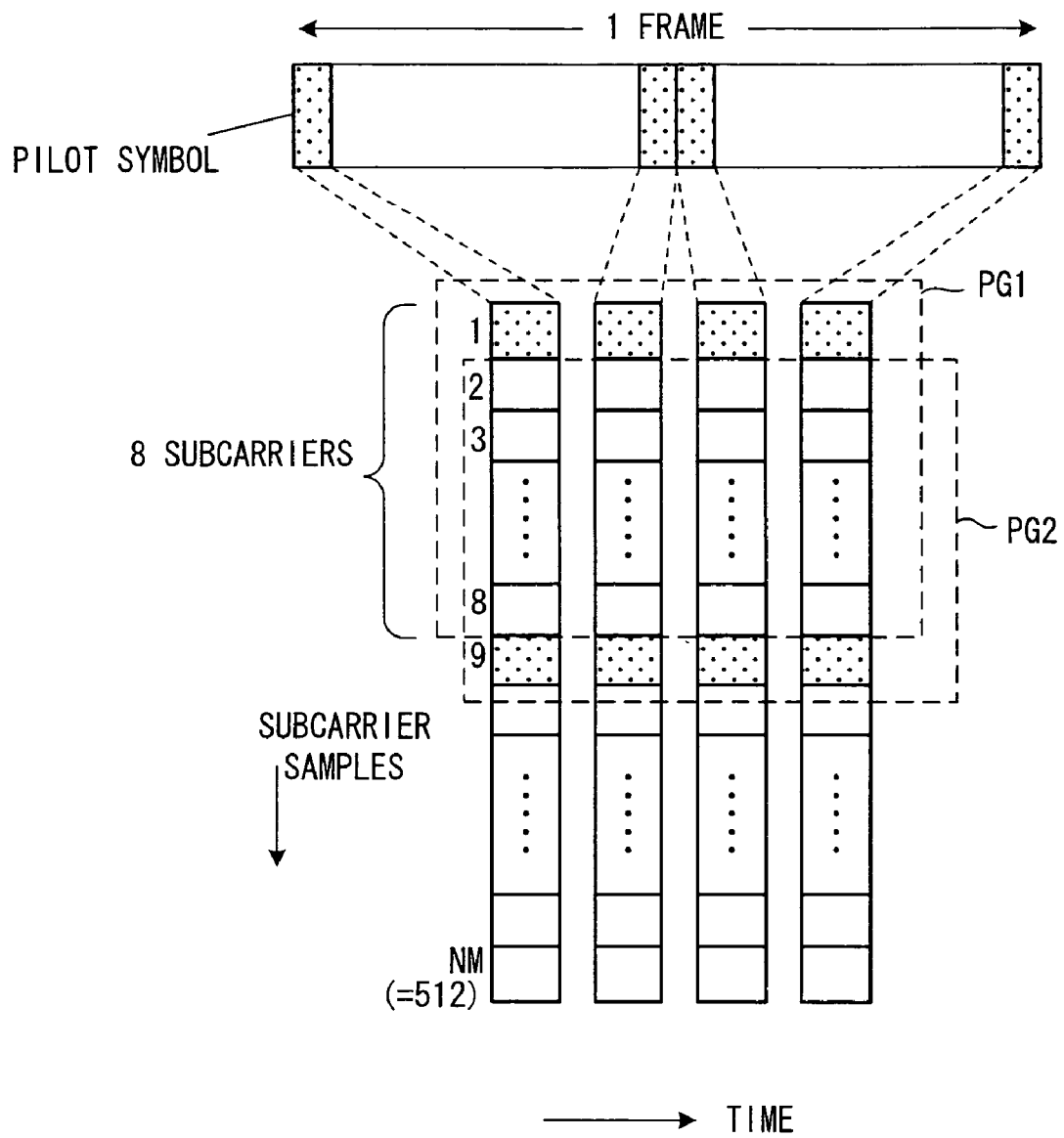
FIG. 27 is a diagram useful in describing operation of a channel estimation unit.
Figure 28:
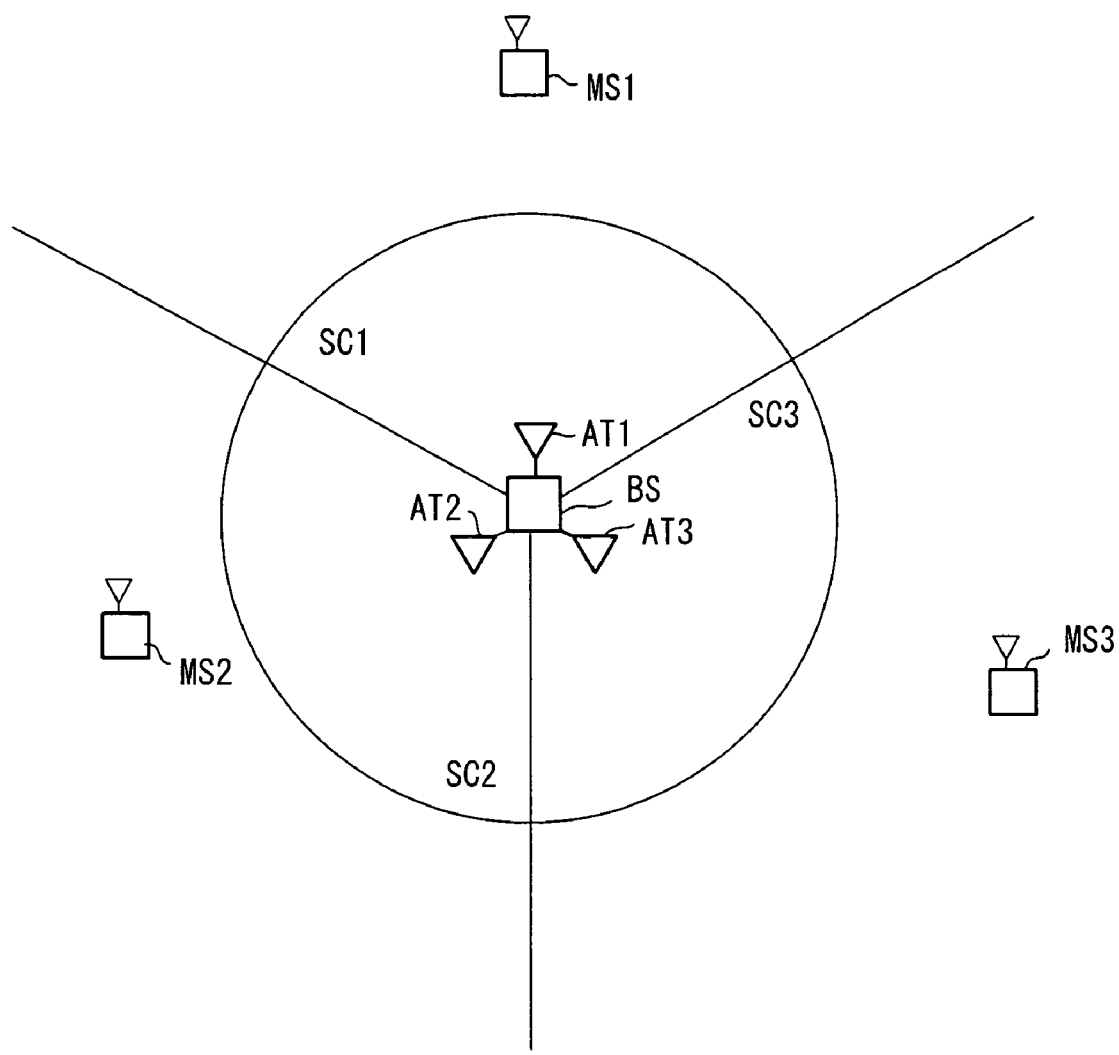
FIG. 28 is a diagram useful in describing a case where the vicinity of a base station has been divided into sectors.

FIG. 5 is a block diagram of the main part of an OFDM receiving apparatus. Other components are similar to those of the arrangement shown in FIG. 25. An FFT unit 61 applies FFT processing to the receive signal and outputs 512 subcarrier components in regard to each pilot symbol. A channel estimation unit 62 has an orthogonal code generator 62a, a 512-multiplier orthogonal code multiplier 62b and an average calculator 62c. The orthogonal code generator 62a generates the orthogonal codes $K_0$ to $K_7$, $K_8$ to $K_{15}$ with respect to each of the sets $CLS_1$ to $CLS_{256}$ of the total of 256 sets each of which is composed of two adjacent subcarriers. The orthogonal code multiplier 62b has 512 multipliers. Two multipliers $MP_1$, $MP_2$ of each set multiply the total of 16 receive subcarrier components $P_{i0}'$ to $P_{i7}'$, $P_{(i+1)0}'$ to $P_{(i+1)7}'$ (i=1, 3, 5, ... 511) of each of the sets by the orthogonal codes $K_0$ to $K_7$, $K_8$ to $K_{15}$.

The average calculator 62c has averaging units $AVR_1$ to $AVR_{256}$ for calculating the average values of the products of multiplication by the orthogonal codes in each of the sets and for outputting the results of the calculations as the channel estimation values of the subcarriers. For example, the average value AV of the first set is found from the following equation:

$$AV = [\Sigma_j P_{1j}' \cdot K_j + \Sigma_j P_{2j}' \cdot K_{(j+8)}]/16 \quad (j=0 \text{ to } 7) \quad (5)$$

The sets of averaging units $AVR_1$ to $AVR_{256}$ output their average values as channel estimation values $CC_i$, $CC_{(i+1)}$ (i=1, 3, 5, ... 511) of two subcarriers of respective ones of the sets. A channel compensation unit 63 multiplies the FFT output by the channel estimation values $CC_i$, $CC_{(i+1)}$ (i=1, 3, 5, ... 511) of respective ones of the subcarriers to thereby compensate for fading.

It should be noted that in a case where spreading has been performed by Gold codes for channel identification purposes, a channel-identification Gold code multiplier is provided between the FFT unit 61 and channel estimation unit 62 and the channel-identification Gold code multiplier multiplies the 512 subcarrier components, which are output from the FFT unit 61, by the channel identification Gold codes and inputs the 512 results of multiplication to the channel estimation unit 62.

(B) Second Pilot Multiplexing Scheme Using Orthogonal Codes

Problem with Pilot Multiplexing Scheme Using Orthogonal Codes

When pilots are multiplexed using orthogonal codes, a problem which arises is that demultiplexing of each pilot, i.e., acquisition of channel estimation values, cannot be performed until all codes are received, as should be evident from Equation (5). Consequently, a problem encountered is that it is not possible to cope with a situation where a momentary channel estimation value is desired at a stage where several pilot symbols at the beginning of a frame, for example, have been received.

Principle of Second Pilot Multiplexing Scheme

According to a second pilot multiplexing scheme, by demarcating orthogonal codes into a suitable N-number of subblocks and arranging the subblocks appropriately, multiplexed pilots can be demultiplexed and channel estimation values can be acquired both in a block in which N-number of subblocks have been selected in the time direction and in a block in which N-number of subblocks have been selected in the subcarrier direction.

Figure 1:
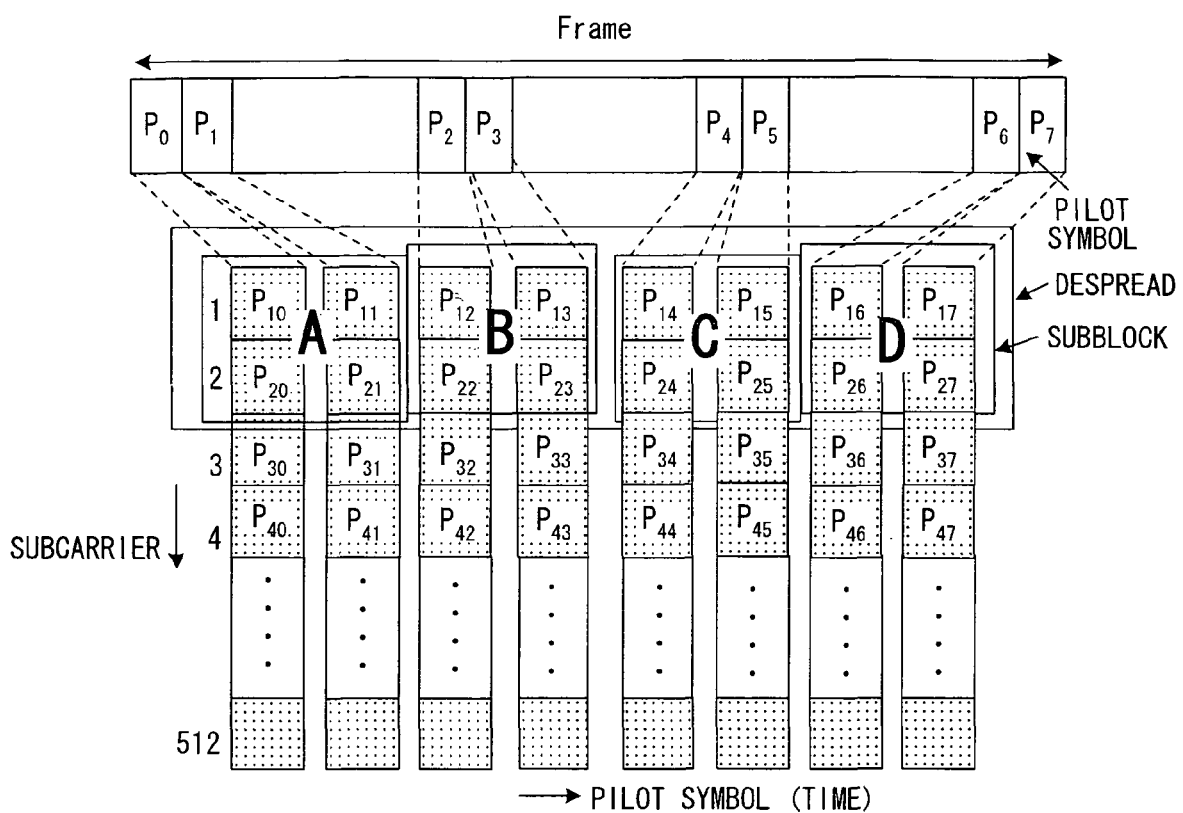
FIG. 1 is a diagram useful in describing a pilot multiplexing method that uses orthogonal codes.
Figure 6:
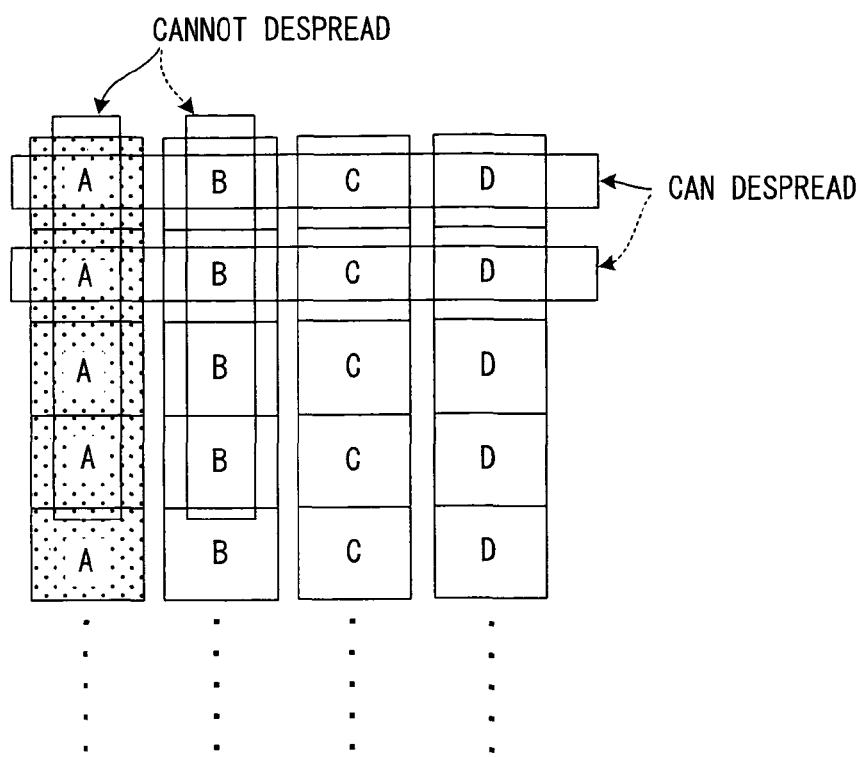
FIG. 6 is a diagram useful in describing arrangement of subblocks.
Figure 7:
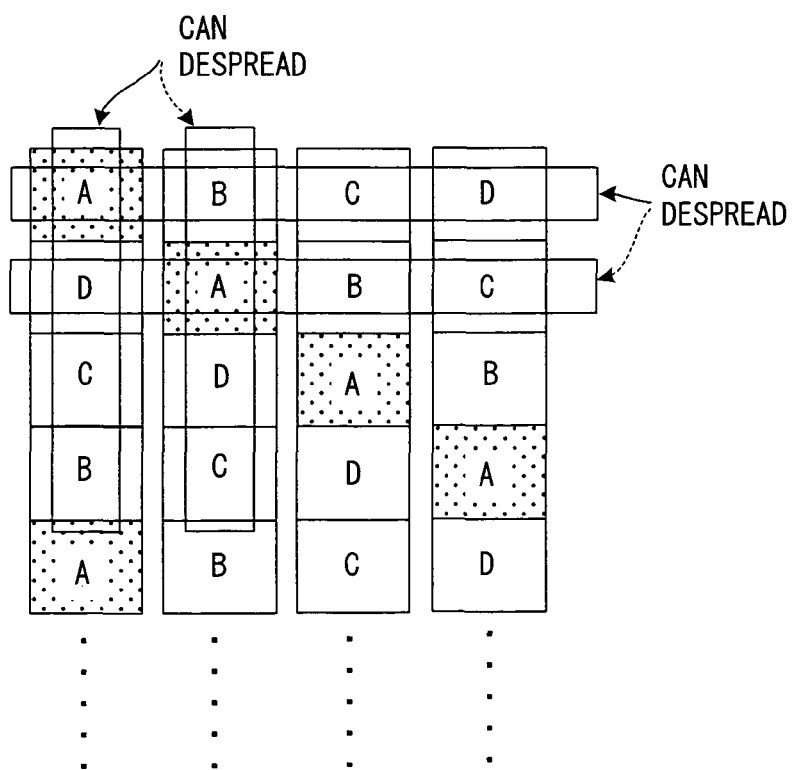
FIG. 7 is a diagram useful in describing arrangement of subblocks in the present invention.

In the example of the frame structure shown in FIG. 1, it is assumed that the orthogonal codes can be decoded in the 2×8 areas, each 2×2 area is adopted as a subblock and the subblocks are denoted by A, B, C, D starting from the left side. The arrangement of the subblocks is illustrated in FIGS. 6 and 7. With the simple arrangement of subblocks A to D as shown in FIG. 6, the orthogonal codes can be decoded by taking four subblocks in the time direction but they cannot be decoded if four subblocks are taken in the subcarrier direction. Accordingly, if the subblocks are arranged by shifting them a little at a time, e.g., one subblock at a time, as shown in FIG. 7, then the orthogonal codes can be decoded even in a case where four subblocks are taken in the subcarrier direction as well as in the time direction.

Pilot Multiplexing Control in OFDM Transmitting Apparatus

Figure 8:
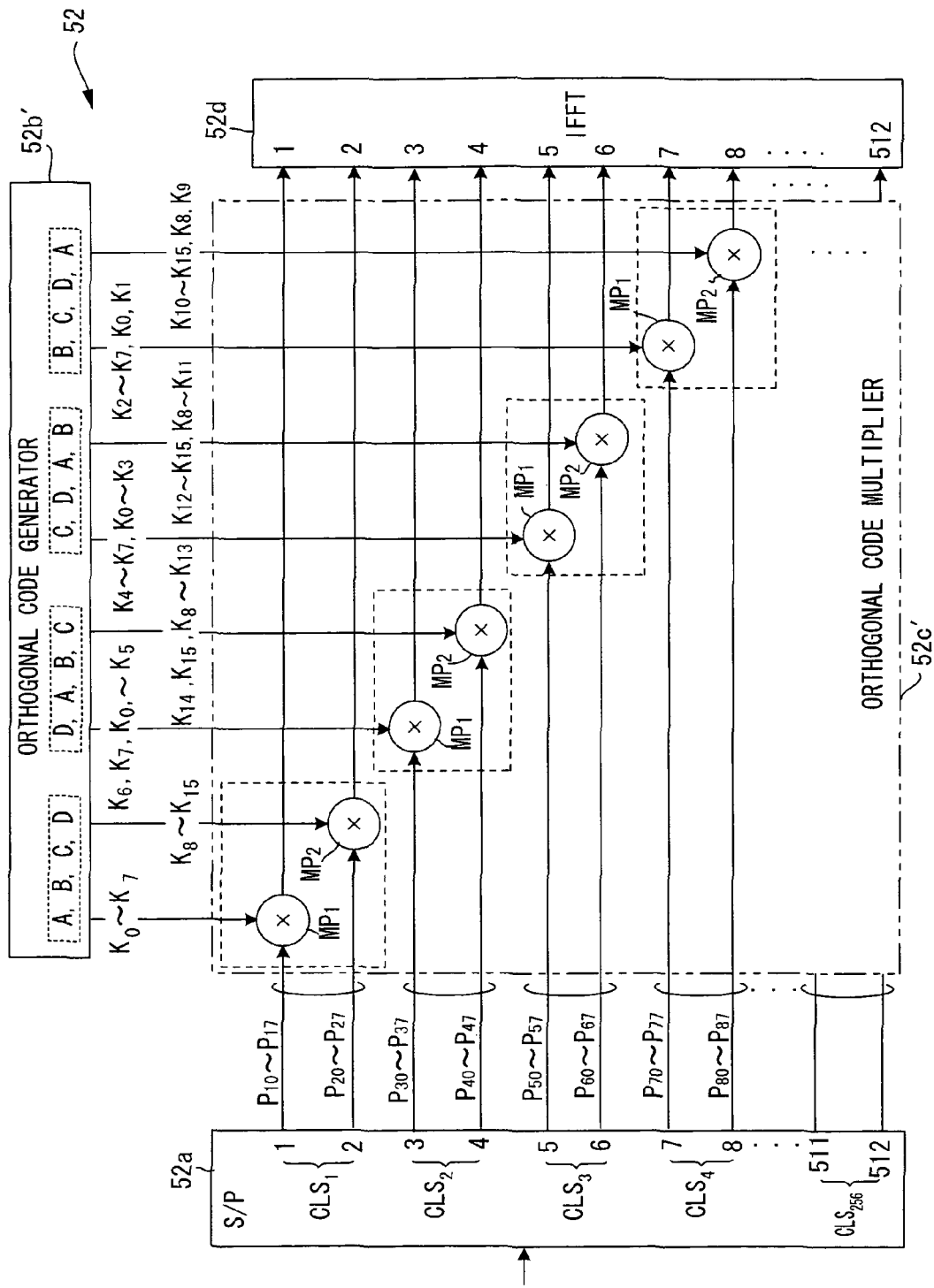
FIG. 8 is a diagram illustrating the structure of a pilot OFDM symbol generator in an OFDM transmitting apparatus.

FIG. 8 is a diagram illustrating the structure of the pilot OFDM symbol generator 52 in an OFDM transmitting apparatus that employs the second pilot multiplexing scheme. The overall structure of the OFDM transmitting apparatus is the same as that shown in FIG. 3. The pilot OFDM symbol generator 52 has a hardware implementation similar to that of the pilot OFDM symbol generator of FIG. 4 and identical components are designated by like reference characters. This arrangement differs in that the sequence of each set of orthogonal codes generated by an orthogonal code generator 52b' is shifted.

In a manner similar to that of the first pilot multiplexing scheme, the pilot OFDM symbol generator 52 in FIG. 8 adopts m (an integer of one or greater, e.g., 2) adjacent subcarriers as a set, multiplies m×n subcarrier components of each set in a plurality (n) of pilot symbols by orthogonal codes and multiplexes the results onto transmit data. For example, the pilot OFDM symbol generator 52 adopts two adjacent subcarriers as a set (for a total of 256 sets in FIG. 1), multiplies a total of 16 subcarrier components $P_{i0}$ to $P_{i7}$, $P_{(i+1)0}$ to $P_{(i+1)7}$ (i=1, 3, 5, ... 511) of each of the sets in the eight pilot symbols $P_0$ to $P_7$ by the orthogonal codes $K_0$ to $K_{15}$ illustrated in FIG. 2, applies IFFT processing to one symbol's worth of results of multiplication and outputs the result.

At this time the orthogonal code generator 52b' generates orthogonal codes of each set in such a manner that the orthogonal codes will be orthogonal in the time direction (see FIG. 7) in regard to m×n subcarriers of each set in n-number of pilot symbols and orthogonal in the subcarrier direction in regard to a total of m×n subcarriers in m-number of pilot symbols. An orthogonal code multiplier 52c' multiplies the subcarrier components of the set by the orthogonal codes of each set, and the IFFT unit 52d applies IFFT processing to the results of multiplication in each of the subcarriers by the orthogonal codes and transmits the results together with data.

More specifically, in the pilot OFDM symbol generator 52, the serial/parallel converter 52a converts pilot data, which enters as a bit serial, to M-number of items of parallel data, branches a single item of pilot data into N paths and outputs a total of M×N (e.g., 512) subcarrier components. The orthogonal code generator 52b' generates the orthogonal codes $K_0$ to $K_{15}$ with respect to each of the sets $CLS_1$ to $CLS_{256}$ of the total of 256 sets, each of which is composed of two adjacent subcarriers, while shifting the sequence of these orthogonal codes. For example, the orthogonal codes $K_0$ to $K_7$ and $K_8$ to $K_{15}$ are input to the multipliers $MP_1$ and $MP_2$, respectively, of the first set; the orthogonal codes $K_6$, $K_7$, $K_0$ to $K_5$ and $K_{14}$, $K_{15}$, $K_8$ to $K_{13}$ are input to the multipliers $MP_1$ and $MP_2$, respectively, of the second set; the orthogonal codes $K_4$ to $K_7$, $K_0$ to $K_3$ and $K_{12}$ to $K_{15}$, $K_8$ to $K_{11}$ are input to the multipliers $MP_1$ and $MP_2$, respectively, of the third set; and the orthogonal codes $K_2$ to $K_7$, $K_0$, $K_1$ and $K_{10}$ to $K_{15}$, $K_8$, $K_9$ are input to the multipliers $MP_1$ and $MP_2$, respectively, of the fourth set. In other words, the orthogonal code generator 52b' generates the orthogonal codes $K_0$ to $K_{15}$ in such a manner that the orthogonal codes will be orthogonal in the time direction (see FIG. 7) in regard to m×n (=2×8) subcarriers of each set and orthogonal in the subcarrier direction in regard to a total of m×n subcarriers in m-number of pilot symbols.

The orthogonal code multiplier 52c' multiplies the first to eighth subcarrier components $P_{10}$ to $P_{80}$ of the first pilot symbol by the codes $K_0$, $K_8$, $K_6$, $K_{14}$, $K_4$, $K_{12}$, $K_2$, $K_{10}$ and multiplies the first to eighth subcarrier components $P_{11}$ to $P_{81}$ of the second pilot symbol by the codes $K_1$, $K_9$, $K_7$, $K_{15}$ $K_5$, $K_{13}$, $K_3$, $K_{11}$. As a result, at the moment two pilot symbols are received, 16 subcarrier components of the first to eighth subcarriers will have been multiplied by the orthogonal codes $K_0$ to $K_{15}$. Similarly, 16 subcarrier components of the ninth to $16^{th}$ subcarriers, of the $17^{th}$ to $24^{th}$ subcarriers, . . . , and of the $505^{th}$ to $512^{th}$ subcarriers are multiplied by the orthogonal codes $K_0$ to $K_{15}$. Accordingly, if two pilot symbols are received on the receiving side, a channel estimation value of each subcarrier can be obtained. Further, if the next two pilot symbols are received, then channel estimation values of each of the subcarriers prevailing at the next moment can be obtained.

Further, the multipliers $MP_1$, $MP_2$ of each set in the orthogonal code multiplier 52c' multiply the total of 16 subcarrier components $P_{i0}$ to $P_{i7}$ $P_{(i+1)0}$ to $P_{(i+1)7}$ of the eight pilot symbols by the orthogonal codes $K_0$ to $K_7$, $K_8$ to $K_{15}$ (i=1, 3, 5, . . . , 511). On the receiving side, therefore, if eight pilot symbols are received, then the channel estimation values of each of the subcarriers can be obtained with good accuracy in a manner similar to that of the first pilot multiplexing scheme.

Control of Reception in Case of Pilot Multiplexing

Figure 9:
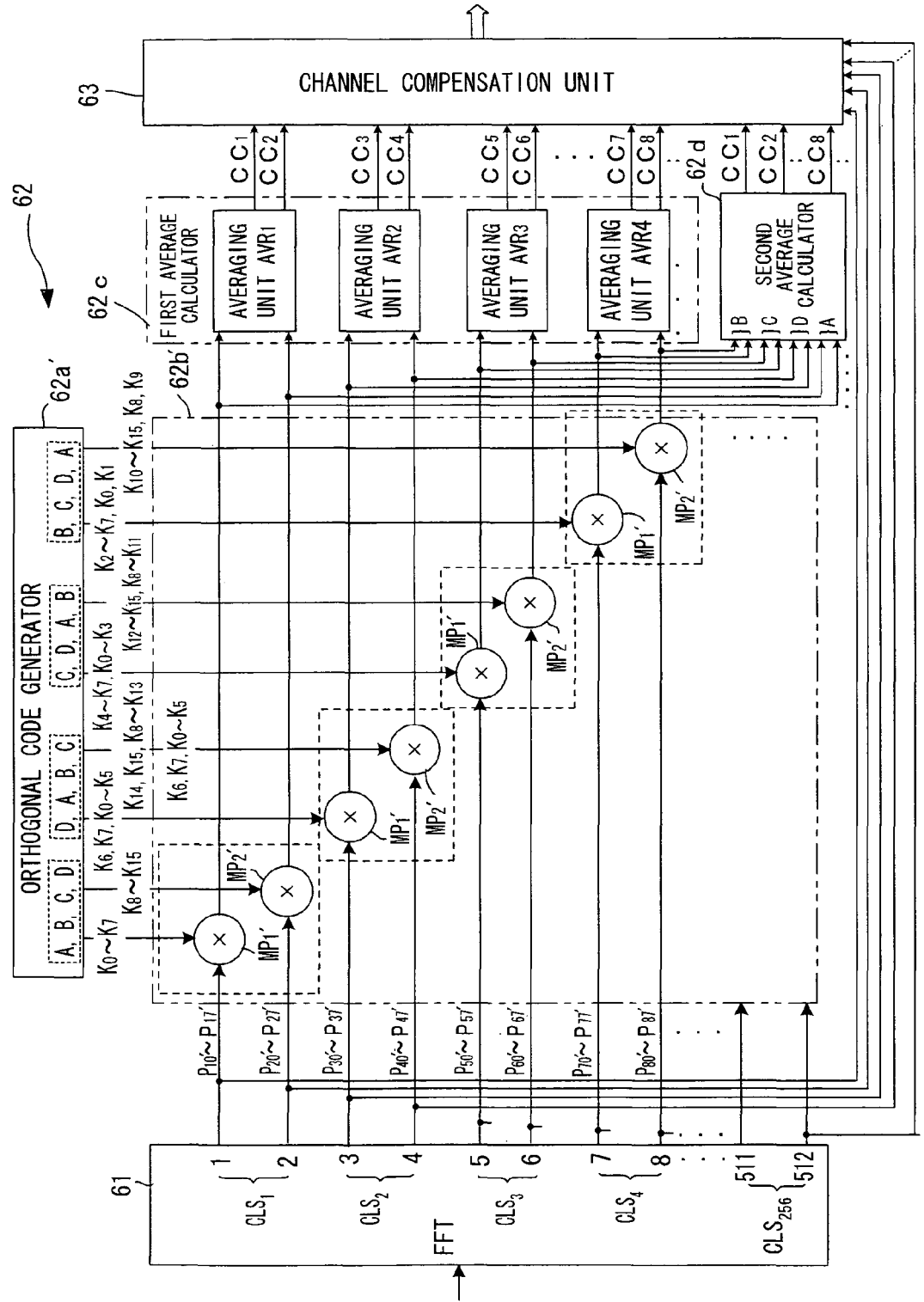
FIG. 9 illustrates an example of the structure of a channel estimation unit in the OFDM receiving apparatus.

FIG. 9 is a diagram illustrating the structure of the channel estimation unit in the OFDM receiving apparatus. Only structure for four sets is shown; the structure for the remaining sets is identical. Further, components identical with those of the channel estimation unit in FIG. 5 are designated by like reference characters. This arrangement differs in that ① the sequence of each set of the orthogonal codes generated by a orthogonal code generator 62a' is shifted, and ② a second average calculator 62d is provided.

In a manner similar to that of the first pilot multiplexing scheme, the FFT unit 61 of the OFDM receiving apparatus, upon receiving a pilot-multiplexed signal, applies FFT processing to the receive signal and outputs a plurality of subcarrier components in regard to each pilot symbol. The channel estimation unit 62 adopts m (an integer of one or greater, e.g., 2) adjacent subcarriers as a set, multiplies m×n subcarrier components of each set in a plurality (n, e.g., 8) of pilot symbols by the orthogonal codes that were used on the transmitting side and calculates the channel estimation values. At this time, in a manner similar to that of the orthogonal code generator 52b' on the transmitting side, the orthogonal code generator 62a' of the channel estimation unit generates the orthogonal codes of each set in such a manner that the orthogonal codes will be orthogonal in the time direction in regard to m×n subcarriers of the same set in n-number of pilot symbols and orthogonal in the subcarrier direction in regard to a total of m×n subcarriers of a plurality of adjacent sets in respective ones of m-number of pilot symbols.

The orthogonal code multiplier 62b' multiplies first to eighth receive subcarrier components $P_{10}'$ to $P_{80}'$ of the first pilot symbol by the codes $K_0$, $K_8$, $K_6$, $K_{14}$, $K_4$, $K_{12}$, $K_2$, $K_{10}$ and multiplies the first to eighth subcarrier components $P_{11}'$ to $P_{81}'$ of the second pilot symbol by the codes $K_1$, $K_9$, $K_7$, $K_{15}$, $K_5$, $K_{13}$, $K_3$, $K_{11}$. As a result, at the moment two pilot symbols are received, 16 subcarrier components of the first to eighth subcarriers will have been multiplied by the orthogonal codes $K_0$ to $K_{15}$. Similarly, 16 subcarrier components of the ninth to $16^{th}$ subcarriers, of the $17^{th}$ to $24^{th}$ subcarriers, . . . , and of the $505^{th}$ to $512^{th}$ subcarriers are multiplied by the orthogonal codes $K_0$ to $K_{15}$. Accordingly, if two pilot symbols are received, a channel estimation value of each subcarrier can be obtained. Further, if the next two pilot symbols are received, then channel estimation values of each of the subcarriers prevailing at the next moment can be obtained.

Further, multipliers $MP_1'$, $MP_2'$ of each of the sets $CLS_1$ to $CLS_{256}$ in the orthogonal code multiplier 62b' multiply the total of 16 subcarrier components $P_{i0}'$ to $P_{i7}'$, $P_{(i+1)0}'$ to $P_{(i+1)7}'$ (i=1, 3, 5, . . . , 511) of the eight pilot symbols by the orthogonal codes $K_0$ to $K_7$, $K_8$ to $K_{15}$ (i=1, 3, 5, . . . , 511). Accordingly, if eight pilot symbols are received, then the channel estimation values of each of the subcarriers can be obtained with good accuracy in a manner similar to that of the first pilot multiplexing scheme.

The averaging units $AVR_1$ to $AVR_{256}$ of the first average calculator 62c calculate the average values of the 2×8 products of multiplication that are output from the multipliers $MP_1'$, $MP_2'$ of each set and output these average values as channel estimation values $CC_i$, $CC_{(i+1)}$ of the two subcarriers of respective ones of the sets. It should be noted, however, that the first average calculator 62c calculates and outputs the channel estimation values $CC_i$, $CC_{(i+1)}$ at intervals of one frame. As a consequence, the first average calculator 62c takes more time to calculate channel estimation values than the second average calculator 62d (described later), although more accurate channel estimation values can be acquired.

Using results of multiplying eight subcarrier components of each of two pilot symbols, i.e, a total of 2×8 subcarrier components, by the orthogonal codes, the second average calculator 62d calculates the average values of these results and outputs the average values as eight channel estimation values $CC_i$ to $CC_{(i+7)}$. In the case of FIG. 9, the second average calculator 62d calculates the average values by dividing by 16 the total values of the results of multiplying the first to eighth receive subcarrier components $P_{10}'$ to $P_{80}'$ of the first pilot symbol by the codes $K_0$, $K_8$, $K_6$, $K_{14}$, $K_4$, $K_{12}$, $K_2$, $K_{10}$ and the results of multiplying the first to eighth receive subcarrier components $P_{11}'$ to $P_{81}'$ of the second pilot symbol by the codes $K_1$, $K_9$, $K_7$, $K_{15}$, $K_5$, $K_{13}$, $K_3$, $K_{11}$. Since the second average calculator 62d is capable of outputting channel estimation values whenever two pilot symbols are received, the channel estimation values can be acquired at a speed higher than that of the first average calculator 62c. However, there is a decline in accuracy.

In accordance with a command from a controller (not shown), the channel compensation unit 63 selects either the channel estimation values that are output from the first average calculator 62c or the channel estimation values that are output from the second average calculator 62d.

(C) Modification of Calculation of Channel Estimation Values

In the embodiment of FIG. 9, a channel estimation value is the same value over one frame in a case where use is made of the channel estimation values that are output from the first average calculator 62c. Further, the channel estimation values of eight subcarriers are the same values in a case where use is made of the channel estimation values that are output from the second average calculator 62d. Strictly speaking, however, the channel estimation values that are output from the first average calculator 62c are four channel estimation values in the vertical direction at the center of the pilot symbols in (a) of FIG. 10. Further, the channel estimation values output from the second average calculator 62d are four channel estimation values in the horizontal direction at the center of the subcarriers in (a) of FIG. 10. In other words, if the orthogonal codes are decoded in a block that is long in the time direction and in a block that is long in the subcarrier direction, then, strictly speaking, eight channel estimation values in the vicinity of the x points will be obtained.

The transition of average channel estimation values in the subcarrier and time directions can be ascertained from these channel estimation values. Accordingly, channel estimation values of each of the subcarriers in each pilot symbol can be found approximately using these channel estimation values.

First Approximation Method

A first approximation method approximates the distribution of channel estimation values in the plane PLN of (b) of FIG. 10 obtained by the method of least squares, etc. (c) of FIG. 10 is a diagram useful in describing the method of least squares. Though this is case for linear approximation, the method is applicable similarly to planar approximation. Let there be a set $(x_1, y_1), (x_2, y_2) \ldots (x_n, y_n)$ of samples of size n with regard to two variables x, y. Assume that a linear relationship indicated by the following equation holds between x and y:

$$y = a + bx \tag{6}$$

Even though the straight line approximates well the sample values, $y_i = a + bx_i$ does not hold when $x = x_i$ holds, i.e., there is a deviation from the straight line. If we let the deviation from the straight line at point $(x_i, y_i)$ be represented by $e_i$, then we have $$e_i = y_i - (a + bx_i) \quad (i=1, 2, \ldots, n) \tag{7}$$

This equation is referred to as a linear regression model. In the illustrated example, the point at $(x_1, y_1)$ lies above the straight line and therefore $e_1$ is positive, and the point at $(x_2, y_2)$ lies below the straight line and therefore $e_2$ is negative. When the point lies on the straight line, as at $(x_3, y_3)$, $e_3 = 0$ holds. If the coefficients a, b of the straight line are decided so as to make the errors $e_1, e_2, \ldots, e^n$ as small as possible, the straight line will best approximate the sample values.

A method of representing unknown coefficients a, b by sample data, as in the manner of minimizing $$Q = e_1^2 + e_2^2 + \ldots e_n^2 \tag{8}$$

is the method of least squares. The straight line thus obtained is the straight line that best fits the results of observation in the sense that the sum of the squares of the errors is small. If Equation (7) is used, Q becomes as follows:

$$Q = (y_1 - a - bx_1)^2 + (y_2 - a - bx_2)^2 + \ldots + (y_n - a - bx_n)^2$$

Since $x_1, x_2, \ldots, x_n, y_1, y_2, \ldots y_n$ are known quantities which are the sample values, Q is a function Q(a,b) of the two variables a and b. In order to find the a, b that will minimize Q, it will suffice to consider the extremal problem of a two-variable function. The requirement that Q take on an extremal value when a and b are varied is as follows:

$$\Delta Q / \Delta a = 0 \tag{9}$$

$$\Delta Q / \Delta b = 0 \tag{10}$$

and a, b are found from Equations (9), (10).

In accordance with the planar approximation method using the method of least squares, channel estimation values can be obtained even with regard to portions other than those at the x points. It should be noted that since the channel estimation values are complex values, it is necessary to perform the same operation with regard to the real and imaginary parts.

Second Approximation Method

Figure 11:
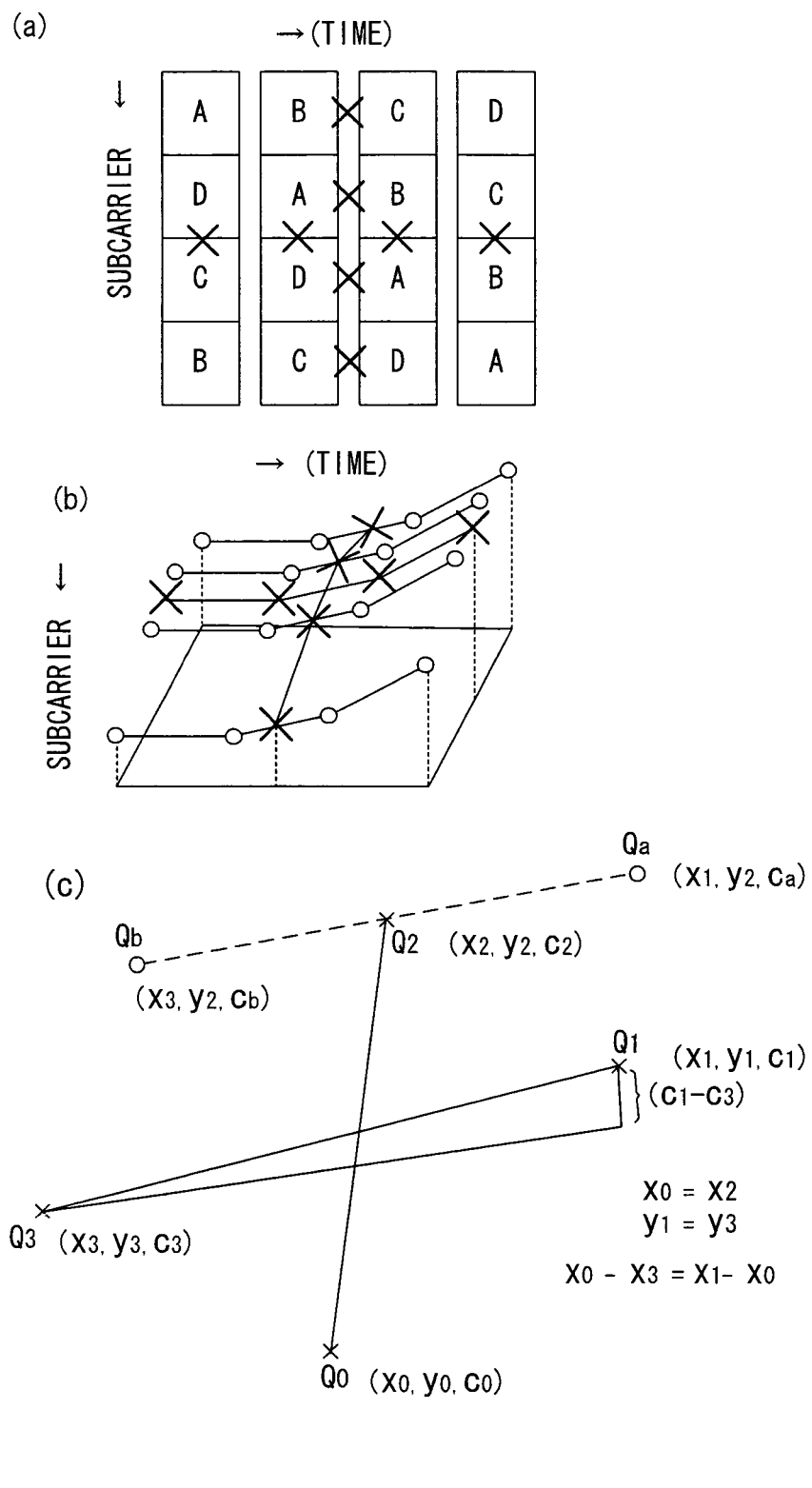
FIG. 11 is a diagram useful in describing a case where a distribution of channel estimation values is obtained by difference interpolation.

A second approximation method obtains a distribution of channel estimation values by difference interpolation which adds a difference in fluctuation along the time direction to fluctuation along the subcarrier direction, or by difference interpolation which adds a difference in fluctuation along subcarrier direction to fluctuation along the time direction, as illustrated in FIG. 11. (a) of FIG. 11 illustrates channel estimation values found by the average calculators 62c, 62d in a manner similar to that of (a) of FIG. 10, and (b) of FIG. 11 illustrates estimation values, which have been obtained by difference interpolation, indicated at the ○ marks. (c) of FIG. 11 is a diagram useful in describing difference interpolation for adding a difference in fluctuation along the time direction to fluctuation along the subcarrier direction. Here $Q_0$ to $Q_3$ are points that conform to channel estimation values obtained by the average calculators 62c, 62d, and $Q_a$, $Q_b$ represent points obtained by difference interpolation. The difference $(C_1 - C_3)$ between channel estimation values at points $Q_1$ and $Q_3$ is found as the difference in fluctuation along the time direction. Here $x_0 = x_2$, $x_0 - x_3 = x_1 - x_0$ holds and therefore channel estimation values $C_a$, $C_b$ at points $Q_a$, $Q_b$ are found in accordance with the following equations by proportional distribution:

$$C_a = C_2 + (C_1 - C_3)/2$$

$$C_b = C_2 - (C_1 - C_3)/2$$

That is, the channel estimation values $C_a$, $C_b$ at points $Q_a$, $Q_b$ can be calculated by adding or subtracting the difference $(C_1 - C_3)/2$ along the time direction to or from the fluctuation $C_2$ along the subcarrier direction. It should be noted that since the channel estimation values are complex values, it is necessary to perform the same operation with regard to the real and imaginary parts.

Combined Use of First and Second Approximation Methods

When the rate of fluctuation in channel estimation values is uniform, performing a planar approximation is better in that noise is averaged, resulting in approximation with good precision. When the rate of fluctuation changes significantly, however, planar approximation results in a large error and, hence, the difference interpolation method should be used to obtain better precision. Accordingly, if a changeover between planar approximation and difference interpolation is performed in dependence upon a variance $\sigma^2$ in amount of fluctuation of channel estimation value, then precision can be improved.

Figure 12:
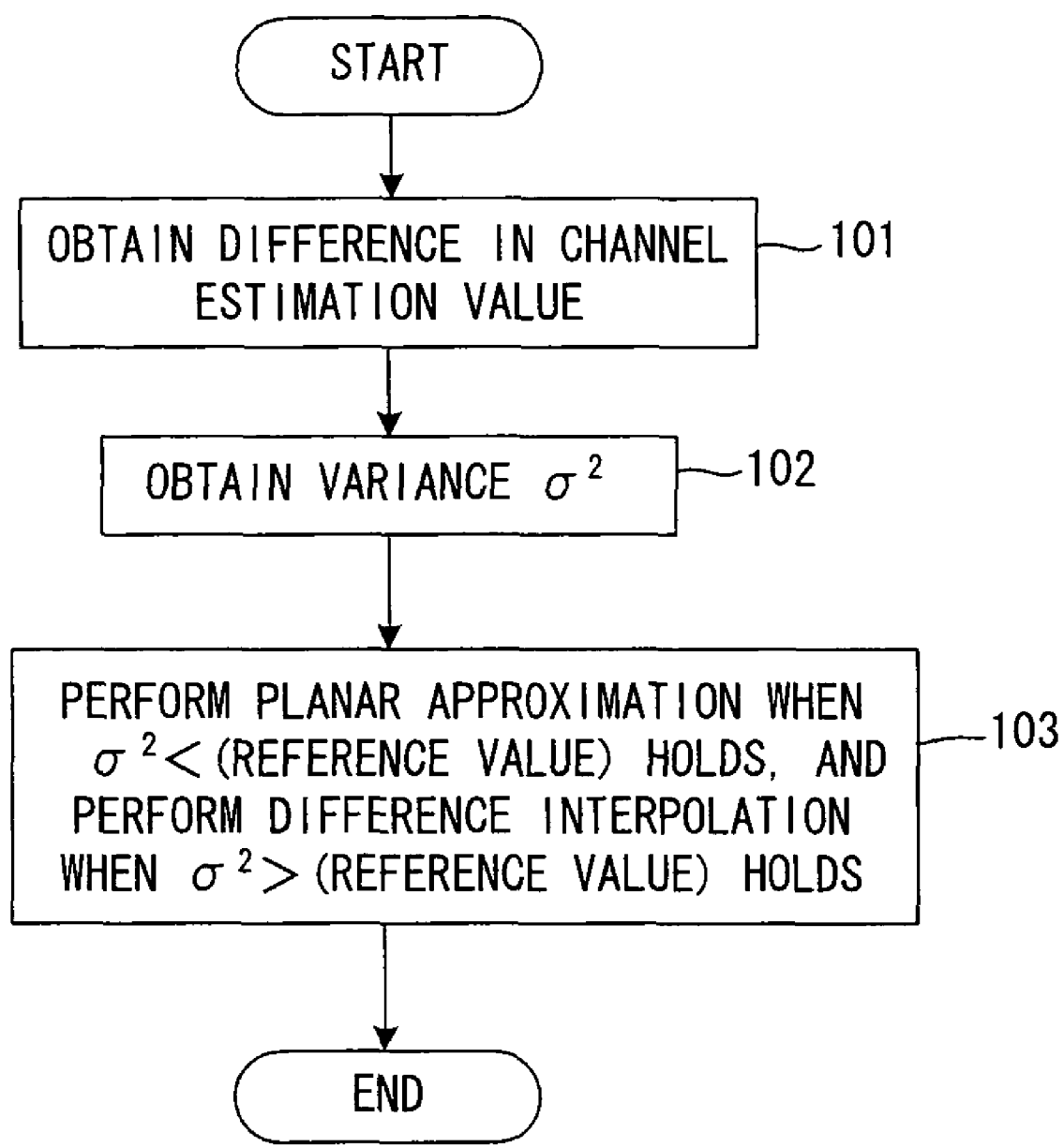
FIG. 12 is a processing flowchart for a case where an approximation method is changed over in accordance with variance in amount of fluctuation in channel estimation values.

FIG. 12 is a processing flowchart for a case where an approximation method is changed over in accordance with variance in amount of fluctuation in channel estimation values. First, a difference in channel estimation values is calculated (step 101), then the variance $\sigma^2$ is obtained using this difference (step 102). If the dispersion $\sigma^2$ is less than a reference value, then the distribution of channel estimation values is found by planar approximation; if $\sigma^2$ is greater than the reference value, then the distribution of channel estimation values is found by difference interpolation (step 103).

(D) Deciding Amount of Shift of Channel Identification Gold Codes

Figure 13:
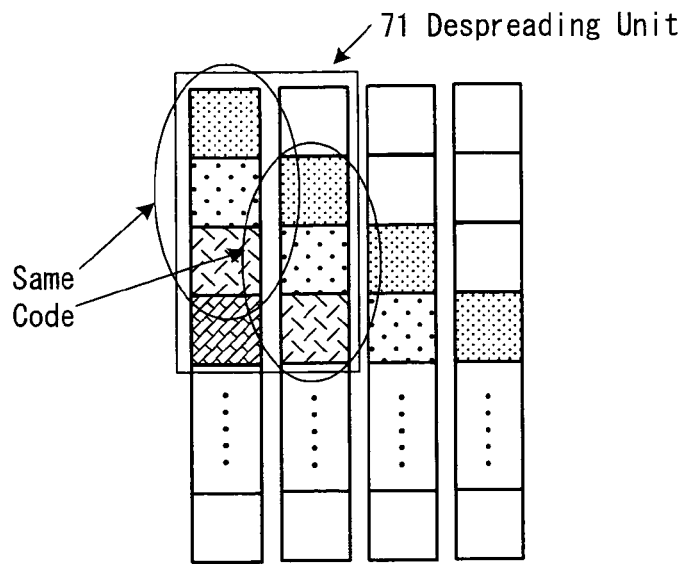
FIG. 13 is a diagram useful in describing a case where amount of shift of channel identification Gold codes is insufficient.
Figure 14:
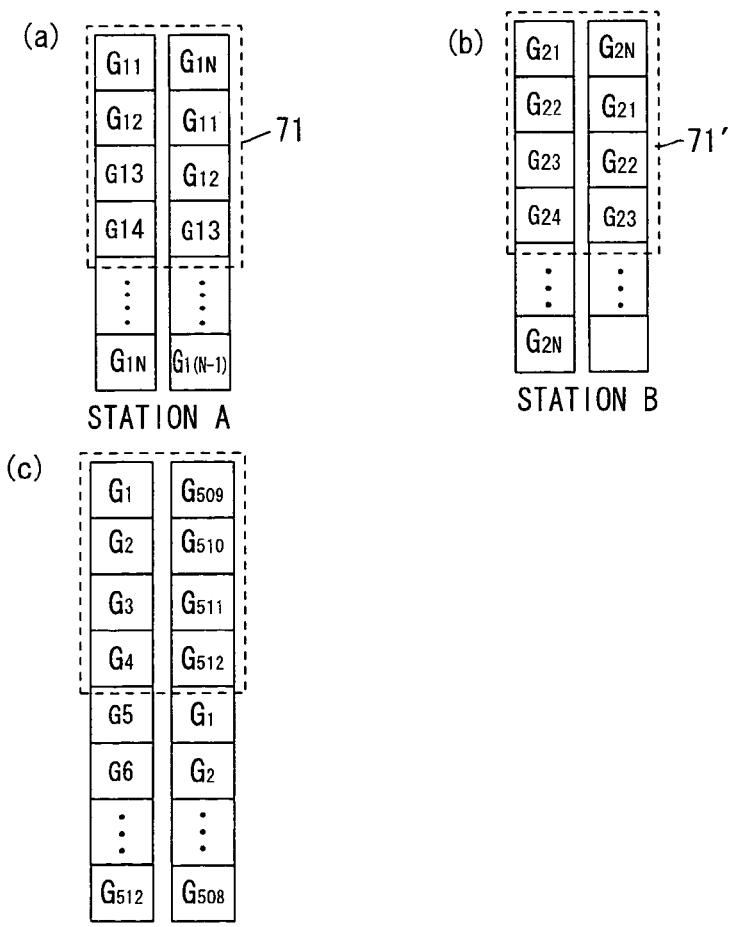
FIG. 14 is a diagram useful in describing a method of deciding amount of shift of channel identification Gold codes.

There are occasions where multiplexed pilots are spread further by channel estimation Gold codes in OFDM symbol units in such a manner that the pilots of a plurality of base stations can be demultiplexed. At this time the channel identification Gold codes in the time direction are used upon being shifted by an amount equivalent to several subcarriers on a per-OFDM-symbol basis so as to avoid regularizing the Gold codes (see FIG. 26). If the amount of shift is insufficient, as shown in FIG. 13, and is less than a code length of 4 in the subcarrier direction in a unit (despreading unit) 71 in which the orthogonal codes are despread, then a correlated portion will appear in the channel identification Gold codes in the orthogonal-code despreading unit 71 and the length of the channel-identification Gold codes will effectively be shortened. For example, if the amount of shift of channel identification Gold codes $G_{11}$ to $G_{1N}$ at station A is one subcarrier, as illustrated in (a) of FIG. 14, then channel identification Gold codes $G_{11}$ to $G_{13}$ in the despreading unit 71 of the orthogonal codes will coincide and the length of the channel identification Gold codes in the despreading unit 71 of the orthogonal code will essentially be 5. Similarly, if the amount of shift of channel identification Gold codes $G_{21}$ to $G_{2N}$ at station B is one subcarrier, as illustrated in (b) of FIG. 14, then channel identification Gold codes $G_{21}$ to $G_{23}$ in the despreading unit 71' of the orthogonal codes will coincide and the length of the channel identification Gold codes in a despreading unit 71' of the orthogonal code will essentially be 5. As a consequence, there is great possibility that the channel identification Gold codes in the despreading unit 71 of station A and the channel identification Gold codes in the despreading unit 71' of station B will coincide. If they do coincide, then it will no longer be possible to demultiplex the pilots of a plurality of base stations.

In view of the foregoing, it is necessary to lengthen the effective length of the channel identification Gold codes in the despreading unit 71 of the orthogonal codes. Accordingly, in the present invention, the amount of shift in the despreading unit of the orthogonal codes is made greater than a length S in the subcarrier direction, as shown in (c) of FIG. 14. If this is done, the effective length of the channel identification Gold codes will be 8 and the possibility that the Gold codes will coincide with the channel identification Gold codes of other stations is minimized. It should be noted that S=L/s holds, where L represents the length of the orthogonal code and m the number of subcarriers in each set thereof.

Figure 15:
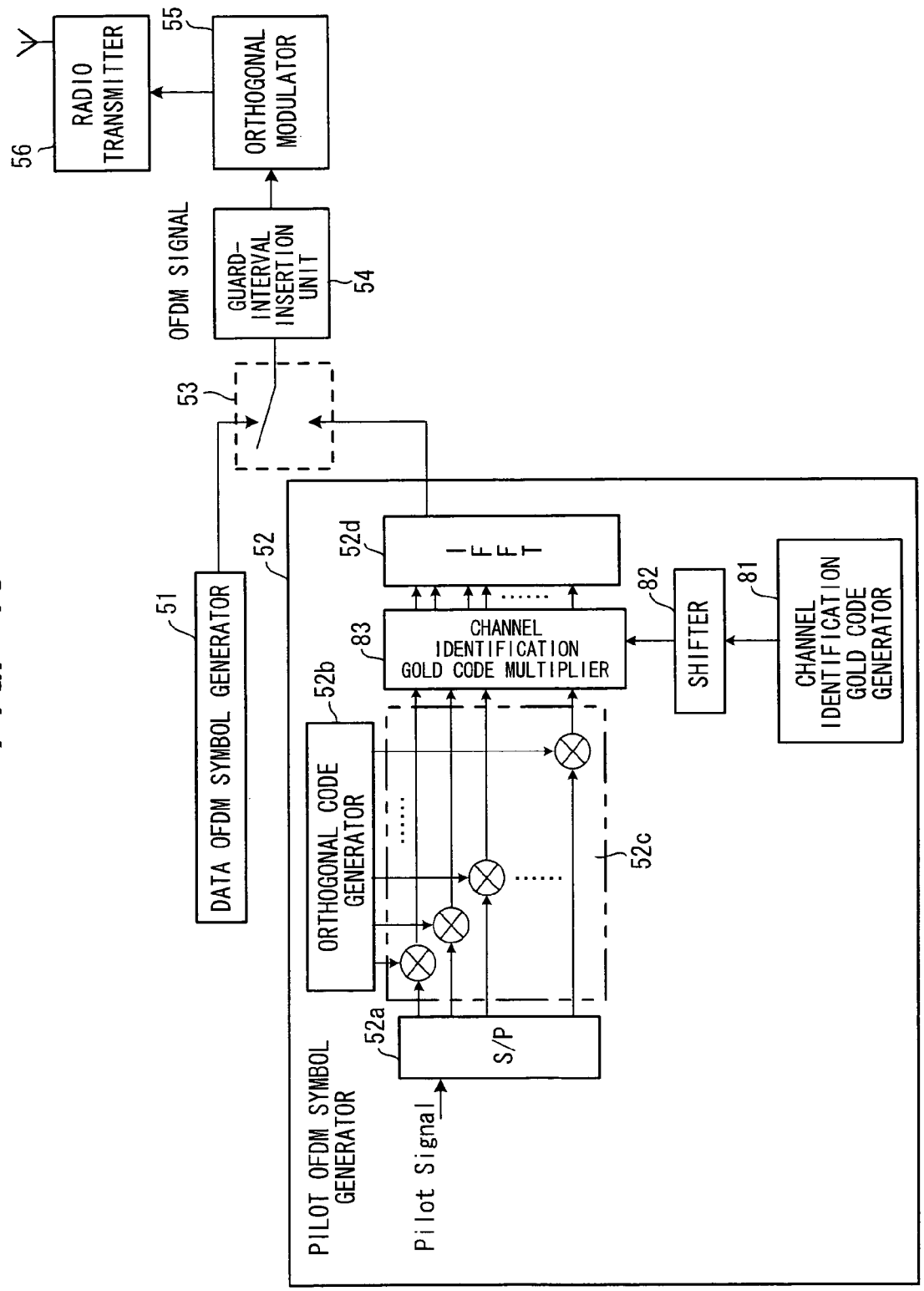
FIG. 15 is a block diagram of the OFDM transmitting apparatus in a case where spreading is performed by channel identification Gold codes.
Figure 16:
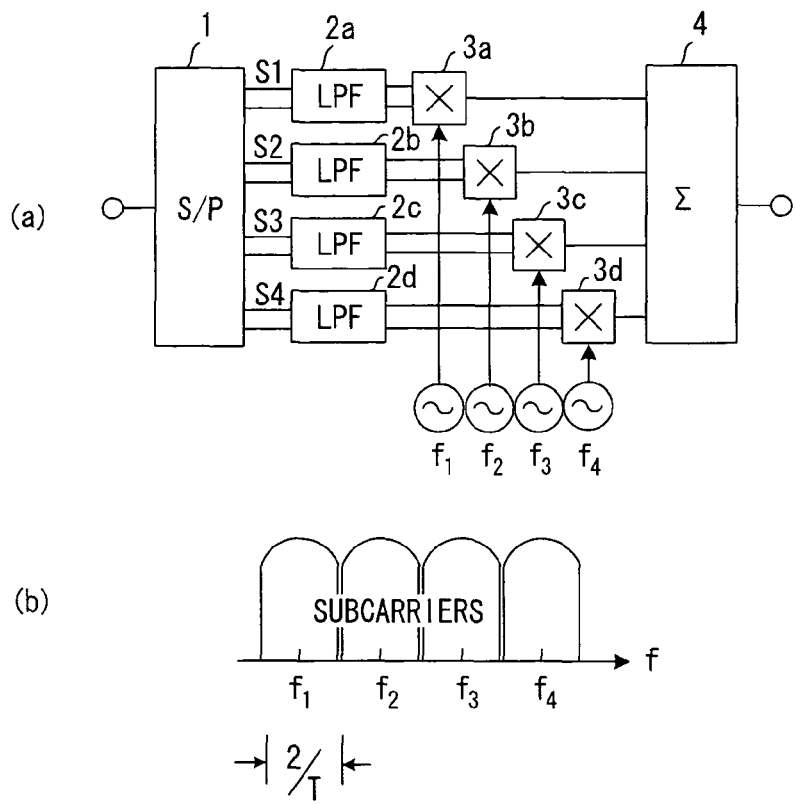
FIG. 16 is a diagram useful in describing a multicarrier transmission scheme according to the prior art.
Figure 17:
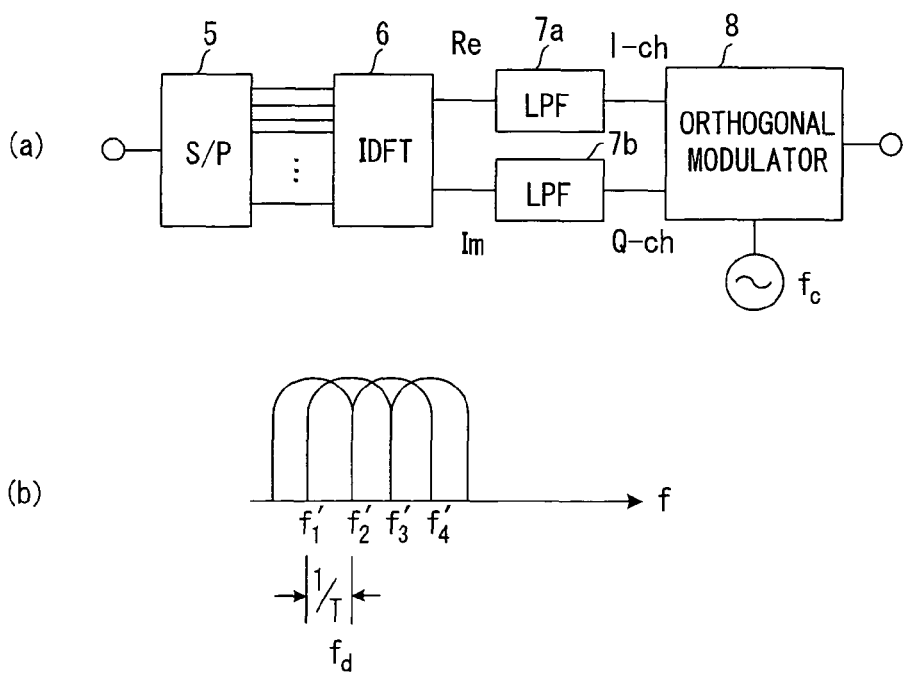
FIG. 17 is a diagram useful in describing an orthogonal frequency division multiplexing scheme according to the prior art.
Figure 18:
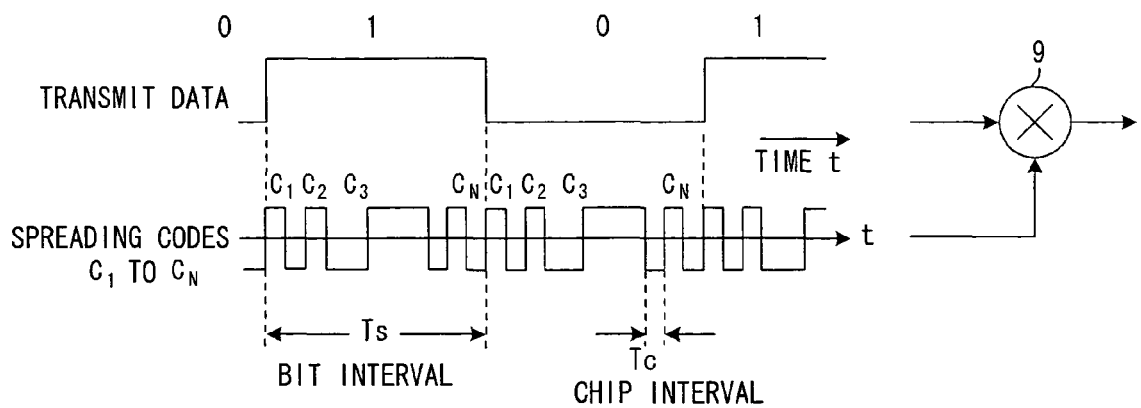
FIG. 18 is a diagram useful in describing code spreading modulation in CDMA.
Figure 19:
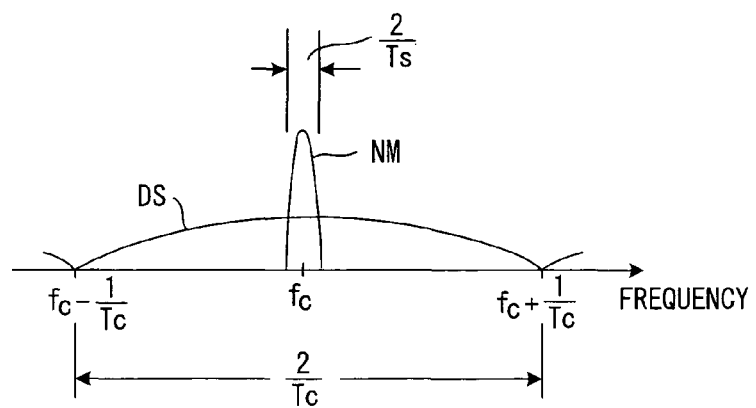
FIG. 19 is a diagram useful in describing spreading of a band in CDMA.
Figure 20:
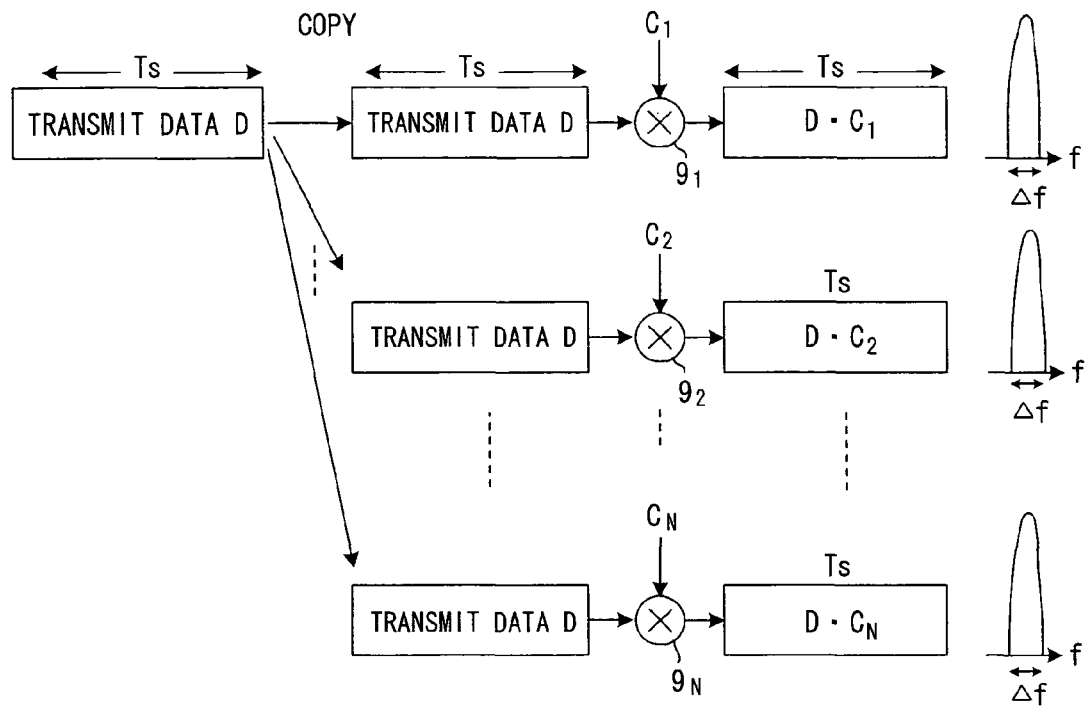
FIG. 20 is a diagram useful in describing the principle of a multicarrier CDMA scheme.
Figure 21:
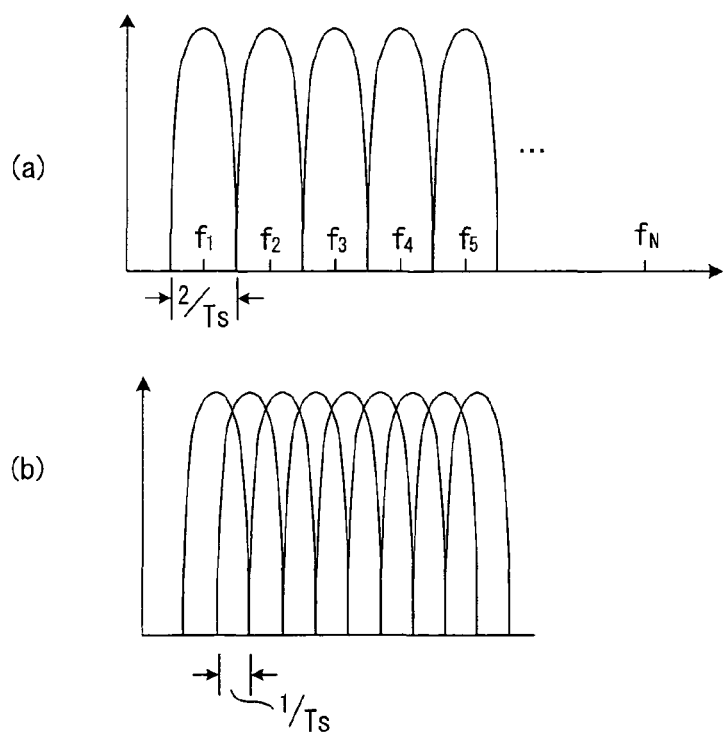
FIG. 21 is a diagram useful in describing placement of subcarriers.

FIG. 15 is a block diagram of the OFDM transmitting apparatus in a case where spreading is performed by channel identification Gold codes. Components identical with those of the OFDM transmitting apparatus of FIG. 3 are designated by like reference characters. This arrangement differs in that the apparatus is provided with a channel identification Gold code generator 81, a shifter 82 for shifting the channel identification Gold codes by more than the despreading unit of the orthogonal codes on a per OFDM-symbol basis, and a channel identification Gold code multiplier 83 on the output side of the orthogonal code multiplier 52c. Furthermore, it is assumed that the data OFDM symbol generator 51 performs spreading using the channel identification Gold codes and executes IFFT processing.

FIG. 15 is described in regard to a case where the data OFDM symbol generator 51 and pilot OFDM symbol generator 52 are each provided with a channel identification Gold code multiplier and IFFT unit. However, it is possible to adopt an arrangement in which a data OFDM symbol and pilot OFDM symbol are combined before multiplication by channel identification Gold codes, after which multiplication is performed by the channel identification Gold codes and IFFT processing executed.

It should be noted that the OFDM receiving apparatus shifts the base-station channel identification codes by S at a time, where S represents length along the subcarrier direction in the despreading unit 71, multiplies the results of FFT processing successively by the base-station channel identification Gold codes, then multiplies the results of this multiplication by the orthogonal codes used on the transmitting side and calculates the channel estimation values.

Thus, in accordance with the present invention, pilots of a plurality of types can be multiplexed. Moreover, if several pilot symbols at the beginning of one frame are received, channel estimation values can be calculated in a short period of time.

Further, in accordance with the present invention, channel estimation values can be calculated by first and second methods. As a result, channel estimation values can be calculated and channel compensation applied by either method that is suitable depending upon whether it is desired to perform channel compensation using channel estimation values that are highly precise though processing takes time or to perform channel compensation upon obtaining channel estimation values in a short period of time though with less precision.

Further, in accordance with the present invention, channel compensation can be performed upon obtaining channel estimation values of prescribed subcarriers at prescribed times by a planar approximation method or difference interpolation method.

Further, in accordance with the present invention, it is so arranged that if spreading is performed by channel identification Gold codes, the codes are shifted by a prescribed length every pilot symbol. As a result, the effective length of the channel identification Gold codes can be increased to make them different from the channel identification Gold codes of other stations. This makes it possible to demultiplex the pilot of one's own station reliably.

What is claimed is:

1. A pilot multiplexing method in an OFDM apparatus for orthogonal frequency division multiplexing (OFDM) and transmitting transmit data and pilots, in which, when m (where m is an integer of one or greater) adjacent subcarriers are adopted as a set, m subcarrier components of each set in n pilot symbols are multiplied by orthogonal codes of which length is m×n and the pilot symbols are transmitted, comprising:

generating orthogonal codes of each set in such a manner that the orthogonal codes will be orthogonal in a time direction in regard to m subcarriers of each set in n pilot symbols and orthogonal in a subcarrier direction in regard to n subcarriers of m adjacent pilot symbols;

first multiplying the m subcarrier components of each set in the time direction by the orthogonal codes of the set;

shifting base-station identification codes by more than L/m (where L is orthogonal-code length) in the subcarrier direction on a per-OFDM-symbol basis;

second multiplying the results of said first multiplication of each subcarrier by said base-station identification codes; and subjecting the results of said second multiplication in each subcarrier to IFFT (Inverse Fast Fourier Transform) and transmitting the results.

* * * * *